US009643598B2

United States Patent
Suzuki et al.

(10) Patent No.: US 9,643,598 B2
(45) Date of Patent: May 9, 2017

(54) CONTROL DEVICE FOR VEHICLE DRIVE DEVICE

(71) Applicants: Takehiko Suzuki, Toyota (JP); Yoichi Tajima, Anjo (JP); Masatoshi Taguchi, Okazaki (JP); Minoru Kubokawa, Okazaki (JP); Tomohiro Kusamizu, Anjo (JP)

(72) Inventors: Takehiko Suzuki, Toyota (JP); Yoichi Tajima, Anjo (JP); Masatoshi Taguchi, Okazaki (JP); Minoru Kubokawa, Okazaki (JP); Tomohiro Kusamizu, Anjo (JP)

(73) Assignee: AISIN AW CO., LTD., Anjo-shi (JP)

( * ) Notice: Subject to any disclaimer, the term of this patent is extended or adjusted under 35 U.S.C. 154(b) by 10 days.

(21) Appl. No.: 14/384,947

(22) PCT Filed: Mar. 29, 2013

(86) PCT No.: PCT/JP2013/059495
§ 371 (c)(1),
(2) Date: Sep. 12, 2014

(87) PCT Pub. No.: WO2013/179757
PCT Pub. Date: Dec. 5, 2013

(65) Prior Publication Data
US 2015/0142233 A1    May 21, 2015

(30) Foreign Application Priority Data
May 31, 2012  (JP) .................. 2012-125113

(51) Int. Cl.
*B60W 20/50*  (2016.01)
*F16H 61/12*  (2010.01)
*B60W 10/11*  (2012.01)

(52) U.S. Cl.
CPC ............ *B60W 20/50* (2013.01); *B60W 10/11* (2013.01); *F16H 61/12* (2013.01);
(Continued)

(58) Field of Classification Search
CPC ....... B60W 20/50; B60W 10/11; F16H 61/12; F16H 2061/1288; F16H 2061/1208; F16H 2061/1276; Y10S 903/945
See application file for complete search history.

(56) References Cited

U.S. PATENT DOCUMENTS

| | | | |
|---|---|---|---|
| 8,280,599 B2 | 10/2012 | Suzuki et al. | |
| 2004/0242359 A1* | 12/2004 | Sugawara | F16H 61/20 475/116 |
| 2011/0238248 A1* | 9/2011 | Suzuki | B60W 30/18072 701/22 |

FOREIGN PATENT DOCUMENTS

| | | | |
|---|---|---|---|
| JP | 2001-271925 A | 10/2000 | |
| JP | 2002-354605 A | 12/2002 | |

(Continued)

OTHER PUBLICATIONS

International Search Report for PCT/JP2013/059495 dated Jul. 2, 2013 [PCT/ISA/210].

*Primary Examiner* — Mussa A Shaawat
*Assistant Examiner* — Michael Kerrigan
(74) *Attorney, Agent, or Firm* — Sughrue Mion, PLLC

(57) ABSTRACT

A control device for a vehicle drive device includes performing neutral travel control in which disengagement/engagement elements are disengaged with the wheels rotating so the state of a speed change mechanism is controlled into a neutral state where transfer of a drive force between the input member to the engine and the output member to the wheels is not performed, and the wheels are driven by a rotary electric machine drive force; and comparing an operating state value of each of target actuators that control the
(Continued)

state of the disengagement/engagement elements, and a determination value so torque from the speed change mechanism to the wheels because of torque transferred by each of the disengagement/engagement elements, falls within an allowable range during neutral travel control, and determines whether the torque transferred from the speed change mechanism to the wheels falls within the allowable range.

22 Claims, 9 Drawing Sheets

(52) U.S. Cl.
CPC ............. *F16H 2061/1208* (2013.01); *F16H 2061/1276* (2013.01); *F16H 2061/1288* (2013.01); *Y10S 903/945* (2013.01)

(56) References Cited

FOREIGN PATENT DOCUMENTS

| | | |
|---|---|---|
| JP | 2005-195042 A | 7/2005 |
| JP | 2005-304205 A | 10/2005 |
| JP | 2008-281111 A | 11/2008 |
| JP | 2010-223399 A | 10/2010 |
| JP | 2010-247689 A | 11/2010 |

* cited by examiner

|  | C1 | C2 | C3 | B1 | B2 | F |
|---|---|---|---|---|---|---|
| 1st | ○ |  |  |  | (○) | △ |
| 2nd | ○ |  | ○ |  |  |  |
| 3rd | ○ |  | ○ |  |  |  |
| 4th | ○ | ○ |  |  |  |  |
| 5th |  | ○ | ○ |  |  |  |
| 6th |  | ○ |  | ○ |  |  |
| Rev |  |  | ○ |  | ○ |  |

(○) : ENGINE BRAKE IN OPERATION

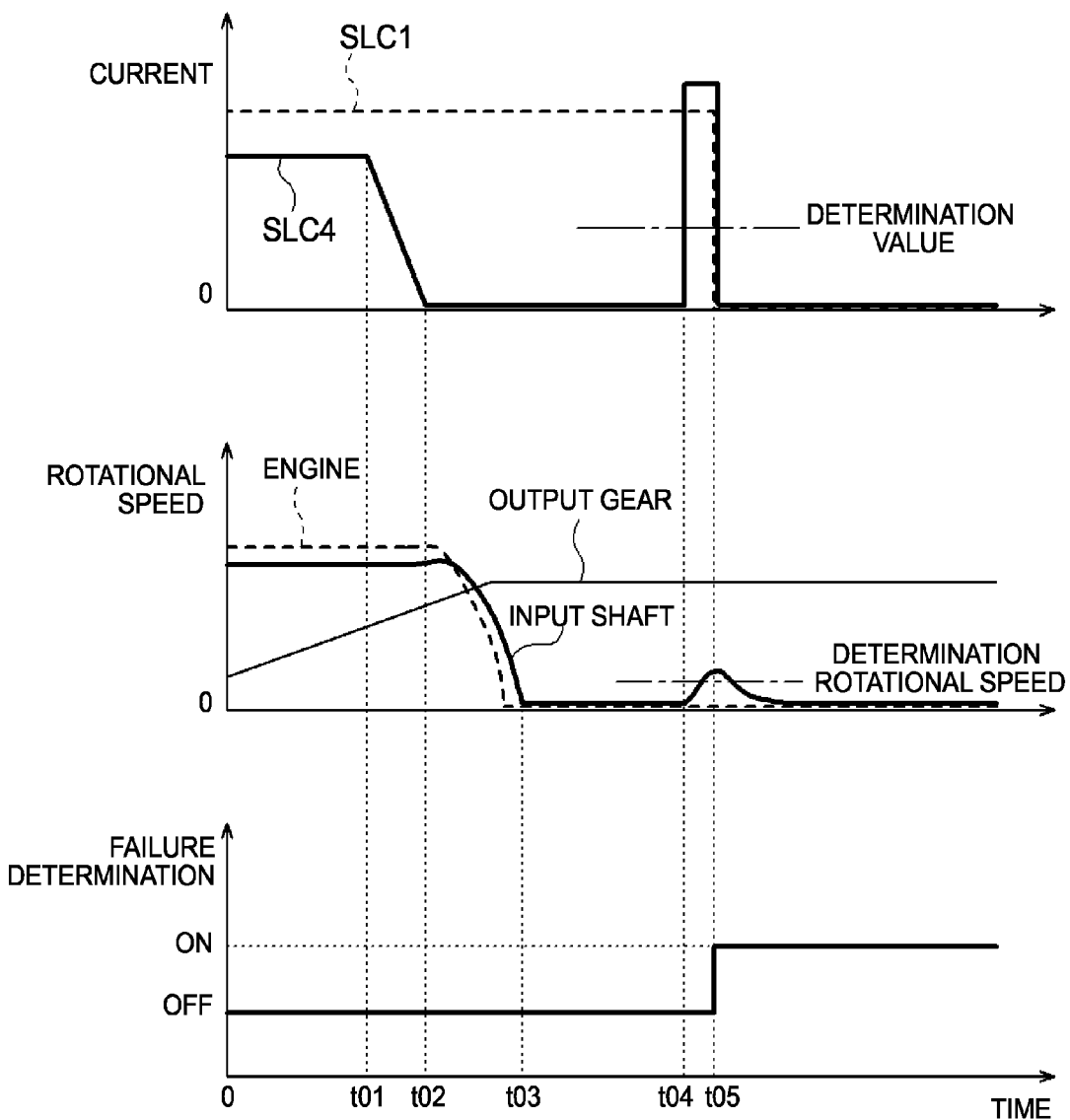
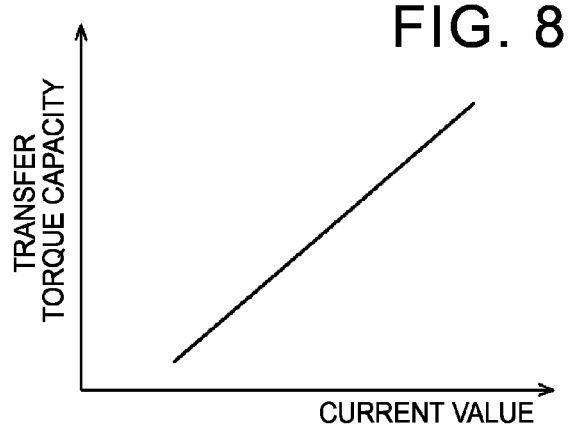

| PREPARATION ENGAGEMENT ELEMENT | DISENGAGEMENT ENGAGEMENT ELEMENT | ESTIMATED ESTABLISHED SHIFT SPEED | ALLOWABLE SIGNAL VALUE (CURRENT VALUE) |
|---|---|---|---|
| C1 (SLC1) | C2 (SLC2) | 4th | Xa12 |
| | C3 (SLC3) | 3rd | Xa13 |
| | B1 (SLC4) | 2nd | Xa14 |
| | B2 (SLC5) | 1st | Xa15 |
| C2 (SLC2) | C1 (SLC1) | 4th | Xa21 |
| | C3 (SLC3) | 5th | Xa23 |
| | B1 (SLC4) | 6th | Xa24 |
| | B2 (SLC5) | NONE | NONE |

| | C1 | C2 | C3 | B1 | B2 | B3 | B4 | F |
|---|---|---|---|---|---|---|---|---|
| 1st | ○ | | | ○ | | | (○) | △ |
| 2nd | ○ | | | ○ | ○ | | | |
| 3rd | ○ | | ○ | ○ | | | | |
| 4th | ○ | | ○ | | | ○ | | |
| 5th | ○ | ○ | ○ | | | | | |
| 6th | | ○ | ○ | | | ○ | | |
| 7th | | ○ | ○ | ○ | | | | |
| 8th | | ○ | | ○ | ○ | | | |
| Rev 1 | | | ○ | ○ | | | ○ | |
| Rev 2 | | | ○ | | | | ○ | ○ |

(○) : ENGINE BRAKE IN OPERATION

CONTROL DEVICE FOR VEHICLE DRIVE DEVICE

CROSS REFERENCE TO RELATED APPLICATIONS

This application is a National Stage of International Application No. PCT/JP2013/059495 filed Mar. 29, 2013, claiming priority based on Japanese Patent Application No. 2012-125113 filed May 31, 2012, the contents of all of which are incorporated herein by reference in their entirety.

TECHNICAL FIELD

The present invention relates to a control device for a vehicle drive device that controls a vehicle drive device including an input member drivably coupled to an internal combustion engine serving as a drive force source for wheels, an output member drivably coupled to the wheels, a speed change mechanism that includes a plurality of engagement elements to establish a plurality of shift speeds in accordance with the engagement/disengagement state of the plurality of engagement elements and that transfers rotation of the input member to the output member while changing the speed of the rotation with the speed ratio of each shift speed, and a rotary electric machine drivably coupled to the wheels not via the speed change mechanism.

BACKGROUND ART

A device disclosed in Patent Document 1 mentioned below is known as an example of the vehicle drive device described above. In the device according to Patent Document 1, an engagement element provided in a speed change mechanism is disengaged to control the speed change mechanism into a neutral state in which transfer of a drive force between an input member and an output member is not performed, and to drive wheels using the drive force of a rotary electric machine.

However, it is assumed that during travel in the neutral state, the operating state of an actuator for the engagement element which has been controlled so as to be disengaged may be unintentionally varied because of erroneous operation of a control device or a failure of the actuator. In this case, it is assumed that torque matching torque transferred through the engagement element corresponding to the actuator, the operating state of which has been varied, is transferred from the speed change mechanism to the wheels. In such a case, negative torque (braking torque) may be transferred from the speed change mechanism to the wheels during travel in the neutral state to affect the travel state of the vehicle or give an uncomfortable feeling to a driver.

A device described in Patent Document 2 mentioned below is configured to prevent locking of rotation in a speed change mechanism when a shift speed is established in the speed change mechanism and in the case where an actuator for an engagement element that is not engaged to establish the shift speed is electrically disconnected or short-circuited so that the engagement element is engaged. Specifically, when the total of current values supplied to three actuators (linear solenoid valves) is equal to or more than a threshold, the device according to Patent Document 2 determines that the speed change mechanism is brought into a locked state with the three actuators driven at the same time so that supply of electric power to one of the actuators is blocked.

However, the device according to Patent Document 2 detects a locked state of the speed change mechanism, and may not determine wheel transfer torque transferred because of unintentionally produced transfer torque of the disengagement engagement element during traveling in the neutral state. In addition, the device according to Patent Document 2 makes a determination on the basis of the sum of current values for the plurality of actuators, and therefore may not accurately determine the effect of the current values for the actuators on the wheel transfer torque.

Related-Art Documents

Patent Documents

[Patent Document 1] Japanese Patent Application Publication No. 2010-223399 (JP 2010-223399 A)
[Patent Document 2] Japanese Patent Application Publication No. 2008-281111 (JP 2008-281111 A)

SUMMARY OF THE INVENTION

Problem to be Solved by the Invention

In view of the foregoing, it is desired to provide a control device for a vehicle drive device capable of accurately determining wheel transfer torque transferred from a speed change mechanism to wheels because of transfer torque of an engagement element varied in the case where the operating state of the engagement element, which has been disengaged, is varied because of erroneous operation of the control device or a failure of an actuator during travel in a neutral state.

Means for Solving the Problem

The present invention provides a control device for a vehicle drive device that controls a vehicle drive device including an input member drivably coupled to an internal combustion engine serving as a drive force source for wheels, an output member drivably coupled to the wheels, a speed change mechanism that includes a plurality of engagement elements to establish a plurality of shift speeds in accordance with an engagement/disengagement state of the plurality of engagement elements and transfers rotation of the input member to the output member while changing a speed of the rotation with a speed ratio of each shift speed, and a rotary electric machine drivably coupled to the wheels not via the speed change mechanism, characterized by including: a neutral travel control section that performs neutral travel control in which disengagement engagement elements, which are at least some of the plurality of engagement elements, are disengaged with the wheels rotating to perform neutral travel control, thereby a state of the speed change mechanism is controlled into a neutral state where transfer of a drive force between the input member and the output member is not performed, and the wheels are driven by a drive force of the rotary electric machine; and a determination section that compares an operation indication value that represents an operating state of each of target actuators, which are actuators that control the engagement/disengagement state of the disengagement engagement elements, and a determination value set in association with each of the target actuators such that wheel transfer torque, which is transferred from the speed change mechanism to the wheels because of transfer torque transferred by each of the disengagement engagement elements, falls within an allowable range during execution of the neutral travel control, and determines on the basis of comparison results whether or not the wheel transfer torque transferred from the speed change mechanism to the wheels falls within the allowable range.

The term "rotary electric machine" as used herein refers to any of a motor (electric motor), a generator (electric generator), and a motor generator that functions both as a motor and as a generator as necessary.

In addition, the term "drivably coupled" as used herein refers to a state in which two rotary elements are coupled to each other in such a way that allows transfer of a drive force, which includes a state in which the two rotary elements are coupled to each other so as to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a friction engagement element, a belt, and a chain.

In the case where transfer torque is produced in the disengagement engagement element because of erroneous operation of the control device or a failure of the actuator when the speed change mechanism is controlled into a neutral state while the wheels are rotating and the wheels are driven by the drive force of the rotary electric machine, torque may be transferred from the speed change mechanism to the wheels in accordance with the transfer torque. At this time, the relationship between transfer torque of each disengagement engagement element and the wheel transfer torque differs among the disengagement engagement elements because the shift speed that may be established differs among the disengagement engagement elements.

According to the characteristic configuration described above, the determination value which is compared with the operation indication value for the target actuator for each disengagement engagement element is set in association with each of the target actuators such that the wheel transfer torque transferred from the speed change mechanism to the wheels because of transfer torque of each disengagement engagement element falls within the allowable range. Therefore, it is possible to accurately determine whether or not the wheel transfer torque falls within the allowable range for each target actuator. Hence, it is possible to accurately determine the effect on the travel state of the vehicle, an uncomfortable feeling given to a driver, and so forth.

The neutral travel control section preferably controls at least the target actuator, the operation indication value for which is equal to or more than the determination value, into a disengaged state in the case where the determination section determines that the wheel transfer torque does not fall within the allowable range.

According to the configuration, the wheel transfer torque for the target actuator, the operation indication value for which is equal to or more than the determination value, falls within the allowable range, which makes it possible to stabilize the travel state of the vehicle and reduce an uncomfortable feeling given to the driver.

The determination value is preferably set for each shift speed that may be established in the case where each of the disengagement engagement elements is engaged.

Preferably, when controlling the speed change mechanism into the neutral state, the neutral travel control section disengages at least one of the engagement elements engaged to establish a predetermined shift speed established when the neutral state is ended as the disengagement engagement element, and engages the rest of the engagement elements engaged to establish the predetermined shift speed excluding the disengagement engagement element; and the determination value is set for each of the rest of the engagement elements and for each shift speed that may be established in the case where each of the disengagement engagement elements is engaged.

The operation indication value is preferably a signal value supplied to the target actuator, or an element transfer torque value indicating torque transferred by the disengagement engagement element.

According to the configuration, it is possible to appropriately determine whether or not the wheel transfer torque falls within the allowable range using either the signal value supplied to the target actuator or the element transfer torque value indicating torque transferred by the disengagement engagement element.

The determination value set in association with each of the disengagement engagement elements is preferably set on the basis of allowable wheel transfer torque determined in advance as torque allowed to be transferred from the speed change mechanism to the wheels during the neutral travel, and on the basis of the operation indication value corresponding to transfer torque of the disengagement engagement element required for the allowable wheel transfer torque to be transferred to the wheels at a shift speed that may be established in the case where the disengagement engagement element corresponding to the determination value is engaged.

According to the configuration, the determination value for each disengagement engagement element is set on the basis of the allowable wheel transfer torque in consideration of the shift speed that may be established for each disengagement engagement element, which makes it possible to improve the accuracy in setting the determination value.

Preferably, the operation indication value is an element transfer torque value indicating torque transferred by the disengagement engagement element; and the element transfer torque value is a value obtained by converting a signal value supplied to the target actuator for the disengagement engagement element into a disengagement transfer torque value indicating torque transferred through the disengagement engagement element, and converting the disengagement transfer torque value into a value of the wheel transfer torque transferred to the wheels at a shift speed that may be established in the case where the disengagement engagement element is engaged.

According to the configuration, the element transfer torque value is obtained by converting the signal value for each target actuator into a wheel transfer torque value in consideration of the shift speed that may be established for each disengagement engagement element, which makes it possible to improve the conversion accuracy.

Preferably, when controlling the speed change mechanism into the neutral state, the neutral travel control section disengages at least one of the engagement elements engaged to establish a predetermined shift speed established when the neutral state is ended as the disengagement engagement element, and engages the rest of the engagement elements engaged to establish the predetermined shift speed excluding the disengagement engagement element.

According to the configuration, the engagement elements excluding the disengagement engagement element, among the engagement elements engaged to establish the predetermined shift speed established when the neutral state is ended, are engaged, and thus the shift speed that may be established in the case where the disengagement engagement element is engaged is limited, which improves the accuracy in setting the determination value and the operation indication value.

The determination section preferably determines that the wheel transfer torque does not fall within the allowable range also in the case where a rotational speed of the input member or the internal combustion engine is raised to a predetermined rotational speed, in addition to the determination based on the comparison between the operation indication value and the determination value.

According to the configuration, even in the case where it is not determined through the comparison between the operation indication value and the determination value that the wheel transfer torque does not fall within the allowable range, it is possible to determine that the wheel transfer torque does not fall within the allowable range because of a rise in rotational speed of the input member or the internal combustion engine.

BRIEF DESCRIPTION OF THE DRAWINGS

FIG. 7 is a timing chart illustrating an example of an allowable transfer torque determination process according to the embodiment of the present invention.

FIG. 8 illustrates the relationship between the transfer torque capacity of an engagement element and the current value supplied to an actuator for the engagement element.

MODES FOR CARRYING OUT THE INVENTION

Figure 1:
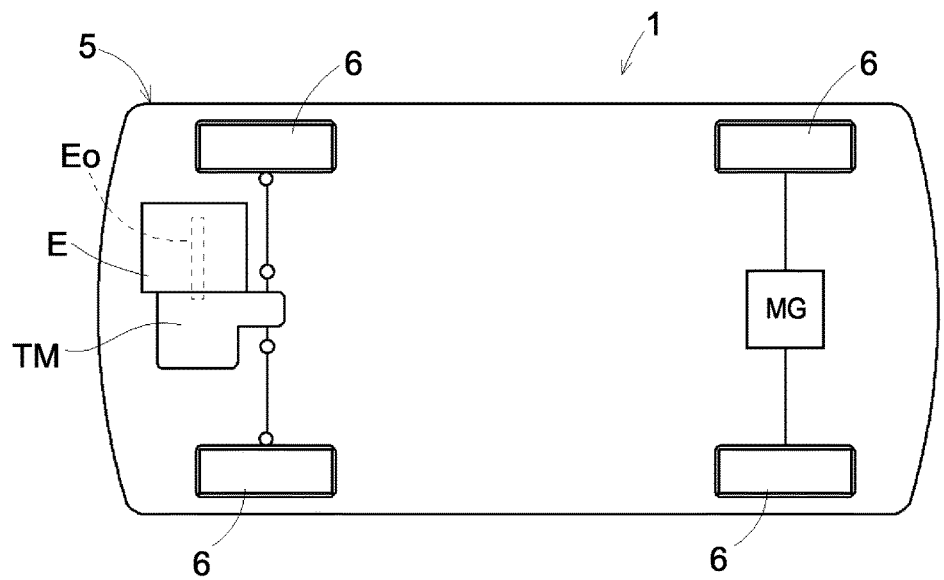
FIG. 1 illustrates the overall configuration of a vehicle on which a vehicle drive device is mounted according to an embodiment of the present invention.
Figure 2:
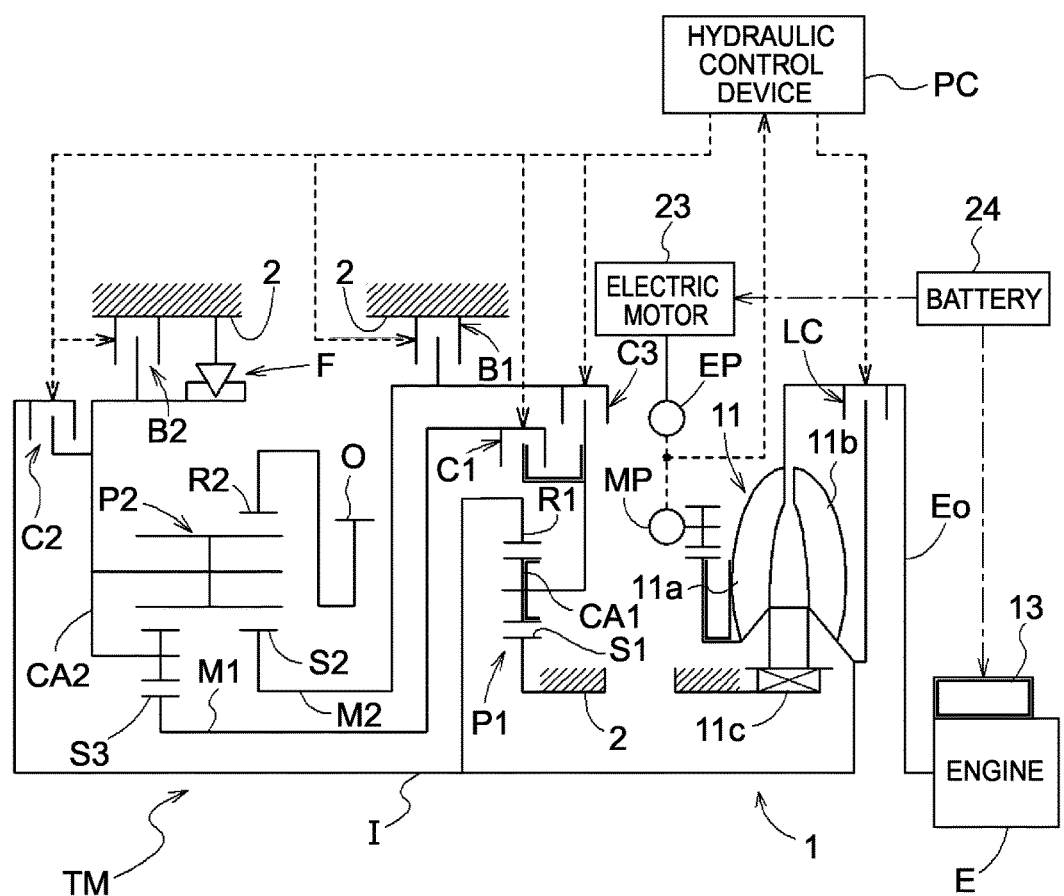
FIG. 2 is a schematic diagram illustrating the configuration of the vehicle drive device according to the embodiment of the present invention.

A control device 30 for a vehicle drive device that controls a vehicle drive device 1 according to an embodiment of the present invention will be described with reference to the drawings. FIGS. 1 and 2 are each a schematic diagram illustrating a schematic configuration of the vehicle drive device 1 and the control device 30 according to the embodiment.

In the embodiment, as illustrated in FIG. 2, the vehicle drive device 1 includes an input shaft I drivably coupled to an engine E serving as a drive force source for wheels 6, an output gear O drivably coupled to the wheels 6, a speed change mechanism TM that includes a plurality of engagement elements C1, B1, . . . to establish a plurality of shift speeds in accordance with the engagement/disengagement state of the plurality of engagement elements C1, B1, . . . and that transfers rotation of the input shaft I to the output gear O while changing the speed of the rotation with the speed ratio of each shift speed, and a rotary electric machine MG drivably coupled to the wheels 6 not via the speed change mechanism TM. In the embodiment, as illustrated in FIG. 1, the engine E is drivably coupled to front wheels of a vehicle 5 via the speed change mechanism TM, and the rotary electric machine MG is drivably coupled to rear wheels. In the embodiment, in addition, the engine E is drivably coupled to the input shaft I via a torque converter 11. The input shaft I corresponds to the "input member" according to the present invention. The output gear O corresponds to the "output member" according to the present invention.

Figure 5:
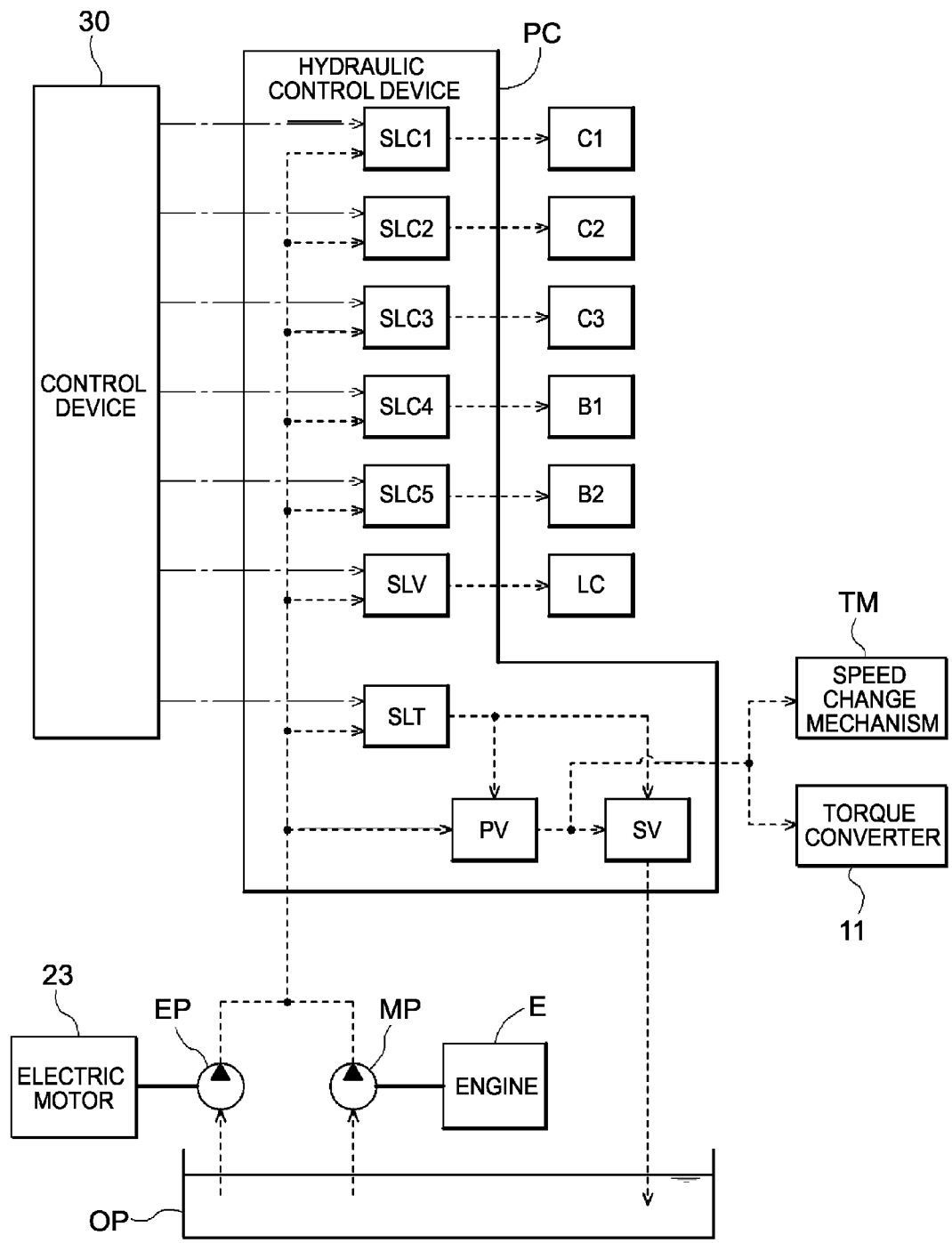
FIG. 5 is a schematic diagram illustrating the configuration of a hydraulic control device according to the embodiment of the present invention.

As illustrated in FIGS. 2 and 5, the vehicle drive device 1 includes a hydraulic control device PC that regulates the hydraulic pressure of working oil supplied from a mechanical pump MP and an electric pump EP to a predetermined pressure to supply the hydraulic pressure to engagement elements C1, B1, . . . of the speed change mechanism TM. The hydraulic control device PC includes linear solenoid valves SLC1, SLC4, . . . as actuators that control the engagement/disengagement state of the engagement elements C1, B1, . . . , respectively, of the speed change mechanism TM. In the embodiment, the linear solenoid valves SLC1, SLC4, . . . regulates the hydraulic pressure to be supplied to the engagement elements C1, B1, . . . to control the engagement/disengagement state of the engagement elements C1, B1, . . . , respectively.

Figure 6:
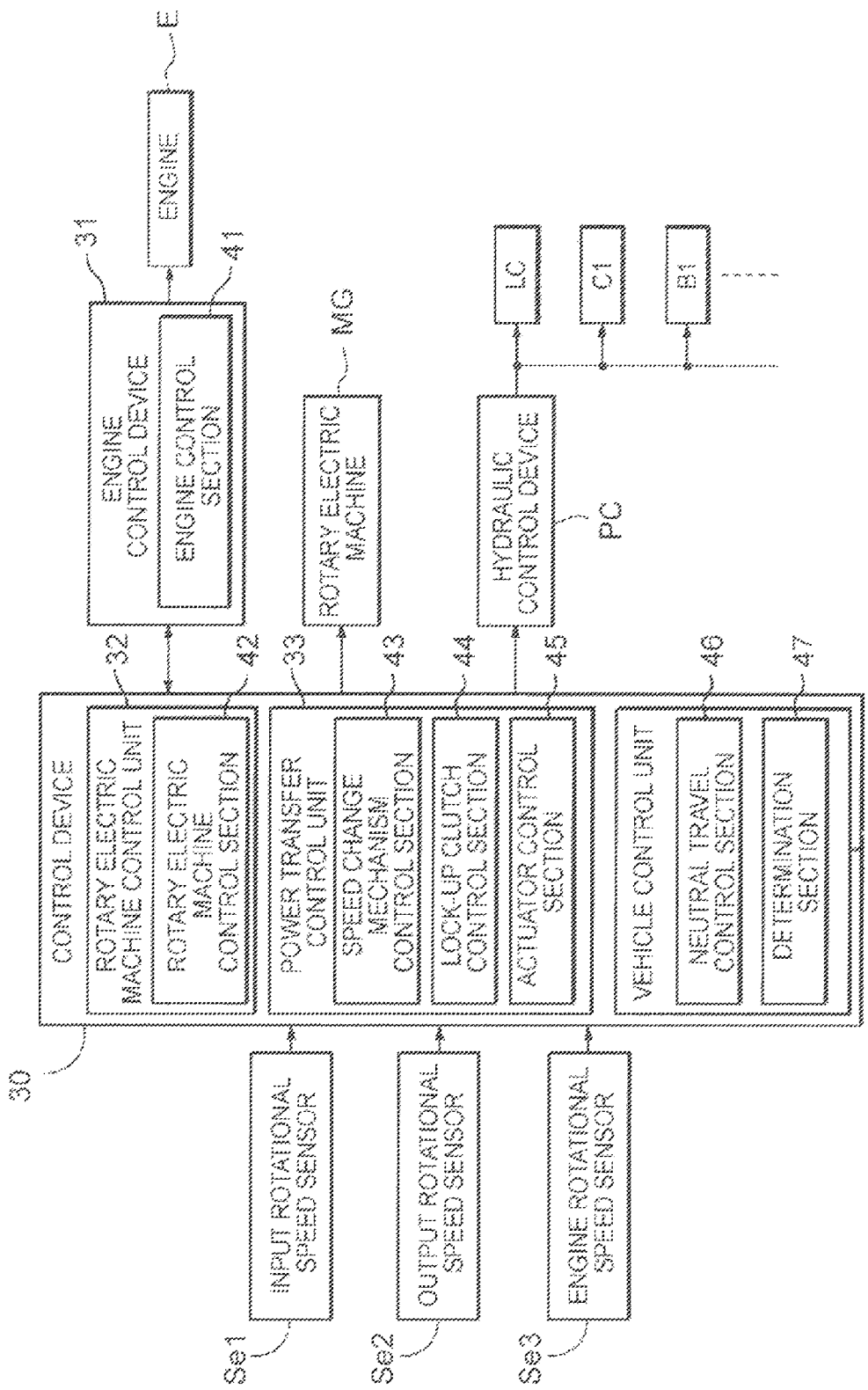
FIG. 6 is a block diagram illustrating the configuration of a control device for the vehicle drive device according to the embodiment of the present invention.

The hybrid vehicle 5 includes the control device 30 which controls the vehicle drive device 1. In the embodiment, as illustrated in FIG. 6, the control device 30 includes a rotary electric machine control unit 32 that controls the rotary electric machine MG, a power transfer control unit 33 that controls the speed change mechanism TM and a lock-up clutch LC, and a vehicle control unit 34 that integrates these control units to control the vehicle drive device 1. The hybrid vehicle 5 also includes an engine control device 31 that controls the engine E.

As illustrated in FIG. 2, the thus configured control device 30 according to the embodiment includes a neutral travel control section 46 and a determination section 47.

The neutral travel control section 46 is a functional section that disengages disengagement engagement elements, which are at least some of the plurality of engagement elements C1, B1, . . . , with the wheels 6 rotating to perform neutral travel control in which the speed change mechanism TM is controlled into a neutral state in which transfer of a drive force between the input shaft I and the output gear O is not performed, and in which the wheels 6 are driven by the drive force of the rotary electric machine MG.

The determination section 47 compares an operation indication value that represents the operating state of each of target actuators, which are actuators (linear solenoid valves)

that control the engagement/disengagement state of the respective disengagement engagement elements, and a determination value set in association with each of the target actuators such that wheel transfer torque, which is transferred from the speed change mechanism TM to the wheels 6 because of transfer torque transferred by each of the disengagement engagement elements, falls within an allowable range during execution of the neutral travel control. The determination section 47 performs allowable transfer torque determination in which it is determined on the basis of the comparison results whether or not the wheel transfer torque transferred from the speed change mechanism TM to the wheels 6 falls within the allowable range.

1. Configuration of Vehicle Drive Device 1

First, the configuration of the vehicle drive device 1 according to the embodiment will be described. FIG. 2 is a schematic diagram illustrating the configuration of a drive/transfer system and a hydraulic pressure supply system of the vehicle drive device 1 according to the embodiment. In FIG. 2, an axially symmetric portion of the configuration is partly not illustrated. In the drawing, the solid lines each indicate a drive force transfer path, the broken lines each indicate a working oil supply path, and the dash-and-dot lines indicate an electric power supply path. As illustrated in the drawing, the vehicle drive device 1 is drivably coupled to the engine E serving as a drive force source for driving the vehicle, and transfers the rotational drive force of the engine E input from the input shaft I via the torque converter 11 to the output gear O with the speed change mechanism TM changing the rotational speed.

The engine E is an internal combustion engine driven by combustion of fuel. Various engines known in the art such as a gasoline engine and a diesel engine may be used as the engine E. In the example, an engine output shaft Eo such as a crankshaft of the engine E is drivably coupled to the input shaft I via the torque converter 11. The torque converter 11 is a device that transfers the rotational drive force of the engine output shaft Eo of the engine E serving as a drive force source to the input shaft I drivably coupled to the speed change mechanism TM via working oil charged inside the torque converter 11. The torque converter 11 includes a pump impeller 11a serving as an input-side rotary member and drivably coupled to the engine output shaft Eo, a turbine runner 11b serving as an output-side rotary member and drivably coupled to the input shaft I, and a stator 11c provided between the pump impeller 11a and the turbine runner 11b and including a one-way clutch. The torque converter 11 transfers a drive force between the pump impeller 11a on the driving side and the turbine runner 11b on the driven side via working oil charged inside the torque converter 11. Consequently, the rotational drive force of the engine E is transferred to the input shaft I. The engine output shaft Eo is provided with a damper to be able to transfer rotation to the wheels 6 side while damping fluctuations in output torque and rotational speed due to intermittent combustion of the engine E.

In the embodiment, in addition, a starter 13 is provided adjacent to the engine E. The starter 13 is constituted of a DC motor or the like, and electrically connected to a battery 24. The starter 13 is driven by electric power supplied from the battery 24 with the engine E stopped and rotates the engine output shaft Eo to start the engine E.

The torque converter 11 includes the lock-up clutch LC serving as a engagement element for lock-up. The lock-up clutch LC is a clutch that couples the pump impeller 11a and the turbine runner 11b so that the pump impeller 11a and the turbine runner 11b rotate together in order to enhance the transfer efficiency by eliminating a difference in rotational speed (slipping) between the pump impeller 11a and the turbine runner 11b. Thus, with the lock-up clutch LC engaged, the torque converter 11 directly transfers the drive force of the engine E to the input shaft I not via working oil. The torque converter 11 including the lock-up clutch LC is supplied with working oil, the pressure of which has been regulated by the hydraulic control device PC.

The speed change mechanism TM is drivably coupled to the input shaft I drivably coupled to the turbine runner 11b serving as the output-side rotary member of the torque converter 11. In the embodiment, the speed change mechanism TM is a stepped automatic transmission that provides a plurality of shift speeds with different speed ratios. In order to establish the plurality of shift speeds, the speed change mechanism TM includes a gear mechanism such as a planetary gear mechanism and the plurality of engagement elements C1, B1, . . . . The speed change mechanism TM transfers rotation of the input shaft I to the output gear O while changing the speed of the rotation with the speed ratio of each shift speed and converting torque. The torque transferred from the speed change mechanism TM to the output gear O is distributed and transferred to two, left and right, axles to be transferred to the wheels 6 drivably coupled to the axles. Here, the term "speed ratio" refers to the ratio of the rotational speed of the input shaft I to the rotational speed of the output gear O with each shift speed established in the speed change mechanism TM. The term "speed ratio" as used herein refers to a value obtained by dividing the rotational speed of the input shaft I by the rotational speed of the output gear O. That is, the rotational speed of the output gear O is obtained by dividing the rotational speed of the input shaft I by the speed ratio. In addition, the torque transferred from the speed change mechanism TM to the output gear O is obtained by multiplying torque transferred from the input shaft I to the speed change mechanism TM by the speed ratio.

In the embodiment, the speed change mechanism TM includes six shift speeds (a first speed, a second speed, a third speed, a fourth speed, a fifth speed, and a sixth speed) with different speed ratios (speed reduction ratios) as forward speeds. In order to establish the shift speeds, the speed change mechanism TM includes gear mechanisms including a first planetary gear device P1 and a second planetary gear device P2, and six engagement elements C1, C2, C3, B1, B2, and F. The rotational state of each rotary element of the first planetary gear device P1 and the second planetary gear device P2 is changed by controlling engagement and disengagement of the plurality of engagement elements C1, B1, . . . excluding the one-way clutch F, and switching is made among the six shift speeds by selectively engaging two of the plurality of engagement elements C1, B1, . . . . Besides the six shift speeds described above, the speed change mechanism TM also provides one reverse speed.

In the embodiment, as illustrated in FIG. 2, the first planetary gear device P1 is a single-pinion planetary gear mechanism disposed coaxially with the input shaft I. That is, the first planetary gear device P1 includes three rotary elements, namely a carrier CA that supports a plurality of pinion gears, and a sun gear S1 and a ring gear R1 that each mesh with the pinion gears. In addition, the second planetary gear device P2 is a Ravigneaux type planetary gear mechanism disposed coaxially with the input shaft I. That is, the second planetary gear device P2 includes four rotary elements, namely two sun gears including a first sun gear S2 and a second sun gear S3, a ring gear R2, and a common carrier CA2 that supports a long pinion gear meshed with both the first sun gear S2 and the ring gear R2 and a short pinion gear meshed with the long pinion gear and the second sun gear S3.

The sun gear S1 of the first planetary gear device P1 is fixed to a case 2 serving as a non-rotary member. The carrier CA1 is drivably coupled to the second sun gear S3 of the second planetary gear device P2 via a first intermediate shaft M1 so as to selectively rotate together with the second sun gear S3, and drivably coupled to the first sun gear S2 of the second planetary gear device P2 via a second intermediate shaft M2 so as to selectively rotate together with the first sun gear S2. The ring gear R1 is drivably coupled to the input shaft I so as to rotate together with the input shaft I.

The first sun gear S2 of the second planetary gear device P2 is drivably coupled to the carrier CA1 of the first planetary gear device P1 via the second intermediate shaft M2 so as to selectively rotate together with the carrier CA1. The carrier CA2 is drivably coupled to the input shaft I so as to selectively rotate together with the input shaft I, and so as to be selectively fixed to the case 2 serving as a non-rotary member. The ring gear R2 is drivably coupled to the output gear O so as to rotate together with the output gear O. The second sun gear S3 is drivably coupled to the carrier CA1 of the first planetary gear device P1 via the first intermediate shaft M1 so as to selectively rotate together with the carrier CA1.

The carrier CA1 of the first planetary gear device P1 is selectively drivably coupled to the first intermediate shaft M1 through a first clutch C1, and selectively drivably coupled to the second intermediate shaft M2 through a third clutch C3. Consequently, the carrier CA1 of the first planetary gear device P1 is selectively drivably coupled to the second sun gear S3 of the second planetary gear device P2 via the first clutch C1 and the first intermediate shaft M1, and selectively drivably coupled to the first sun gear S2 of the second planetary gear device P2 via the third clutch C3 and the second intermediate shaft M2. In the embodiment, in addition, the second intermediate shaft M2 is selectively fixed to the case 2 through a first brake B1. Consequently, the first sun gear S2 of the second planetary gear device P2 is selectively drivably coupled to the carrier CA1 of the first planetary gear device P1 via the second intermediate shaft M2 and the third clutch C3, and is selectively fixed to the case 2 through the first brake B1.

The carrier CA2 of the second planetary gear device P2 is selectively fixed to the case 2 through the one-way clutch F, and selectively drivably coupled to the input shaft I through a second clutch C2. Here, the one-way clutch F selectively fixes the carrier CA2 to the case 2 by hindering only rotation in one direction. The carrier CA2 of the second planetary gear device P2 can also be selectively fixed to the case 2 through a second brake B2.

In the embodiment, the first clutch C1, the second clutch C2, the third clutch C3, the first brake B1, and the second brake B2 are all friction engagement elements. Specifically, the clutches and the brakes are multi-plate clutches and multi-plate brakes that are actuated by a hydraulic pressure. Engagement and disengagement of the engagement elements C1, C2, C3, B1, and B2 is controlled by a hydraulic pressure supplied from the hydraulic control device PC.

A friction engagement element transfers torque between engagement members of the friction engagement element through friction between the engagement members. In the case where there is a difference in rotational speed (slipping) between the engagement members of the friction engagement element, torque (slip torque) corresponding to the magnitude of the transfer torque capacity is transferred from a member with a higher rotational speed to a member with a lower rotational speed through dynamic friction. In the case where there is no difference in rotational speed (slipping) between the engagement members of the friction engagement element, torque up to the magnitude of the transfer torque capacity is transferred between the engagement members of the friction engagement element through static friction. Here, the term "transfer torque capacity" refers to the magnitude of maximum torque that can be transferred by a friction engagement element through friction. The magnitude of the transfer torque capacity is varied in proportion to the engagement pressure of the friction engagement element. The term "engagement pressure" refers to a pressure that presses an input-side engagement member (friction plate) and an output-side engagement member (friction plate) against each other. In the embodiment, the engagement pressure is varied in proportion to the magnitude of the supplied hydraulic pressure. That is, in the embodiment, the magnitude of the transfer torque capacity is varied in proportion to the magnitude of the hydraulic pressure supplied to the friction engagement element.

Each of the friction engagement elements includes a return spring, and is urged to be disengaged by the reaction force of the spring. When a force produced by the hydraulic pressure supplied to a hydraulic cylinder of the friction engagement element exceeds the reaction force of the spring, the friction engagement element starts producing the transfer torque capacity to bring the friction engagement element from the disengaged state into the engaged state. The hydraulic pressure at which the transfer torque capacity starts being produced is referred to as a "stroke end pressure". Each of the friction engagement elements is configured such that the transfer torque capacity of the friction engagement element is increased in proportion to an increase in supplied hydraulic pressure after the hydraulic pressure exceeds the stroke end pressure. The friction engagement elements may not be provided with a return spring, and may be structured to be controlled in accordance with a difference between the hydraulic pressures applied to both sides of a piston of the hydraulic cylinder.

In the embodiment, the term "engaged state" refers to a state in which a friction engagement element is producing a transfer torque capacity. The engaged state includes a slipping engagement state and a direct engagement state. The term "disengaged state" refers to a state in which a friction engagement element is not producing a transfer torque capacity. The term "slipping engagement state" refers to an engaged state in which there is a difference in rotational speed (slipping) between engagement members of a friction engagement element. The term "direct engagement state" refers to an engaged state in which there is no difference in rotational speed (slipping) between engagement members of a friction engagement element. The term "non-direct engagement state" refers to an engagement state other than the direct engagement state, and includes the disengaged state and the slipping engagement state. Here, the term "engagement/disengagement state" of an engagement element means that the engagement element is either in an engaged state (the direct engagement state or the slipping engagement state) or in a disengaged state.

In the friction engagement elements, a transfer torque capacity is occasionally produced by dragging between the engagement members (friction members) even in the case where the control device 30 is not providing a command to produce a transfer torque capacity. For example, a transfer torque capacity is occasionally produced by dragging between the friction members which contact each other even in the case where the friction members are pressed against each other by the piston. Thus, the term "disengaged state" also includes a state in which a transfer torque capacity is produced by dragging between the friction members in the case where the control device 30 is not providing a friction engagement device with a command to produce a transfer torque capacity.

The rotary electric machine MG includes a stator fixed to a non-rotary member and a rotor rotatably supported at a radially inner position corresponding to the stator. The rotor of the rotary electric machine MG is drivably coupled to the wheels 6 not via the speed change mechanism TM. In the embodiment, the rotary electric machine MG is drivably coupled to the rear wheels, rather than the front wheels to which the speed change mechanism TM is drivably coupled. The rotary electric machine MG is electrically connected to a battery serving as an electricity accumulation device via an inverter that performs a DC/AC conversion. The rotary electric machine MG can function as a motor (electric motor) that is supplied with electric power to produce power and as a generator (electric generator) that is supplied with power to generate electric power. That is, the rotary electric machine MG performs power running using electric power supplied from the battery via the inverter, or generates electric power using a rotational drive force transferred from the wheels 6. The generated electric power is accumulated in the battery via the inverter. Here, the rotational drive force transferred from the wheels 6 includes the drive force of the engine E transferred via the wheels 6 and the road surface.

Figures 3, 4:
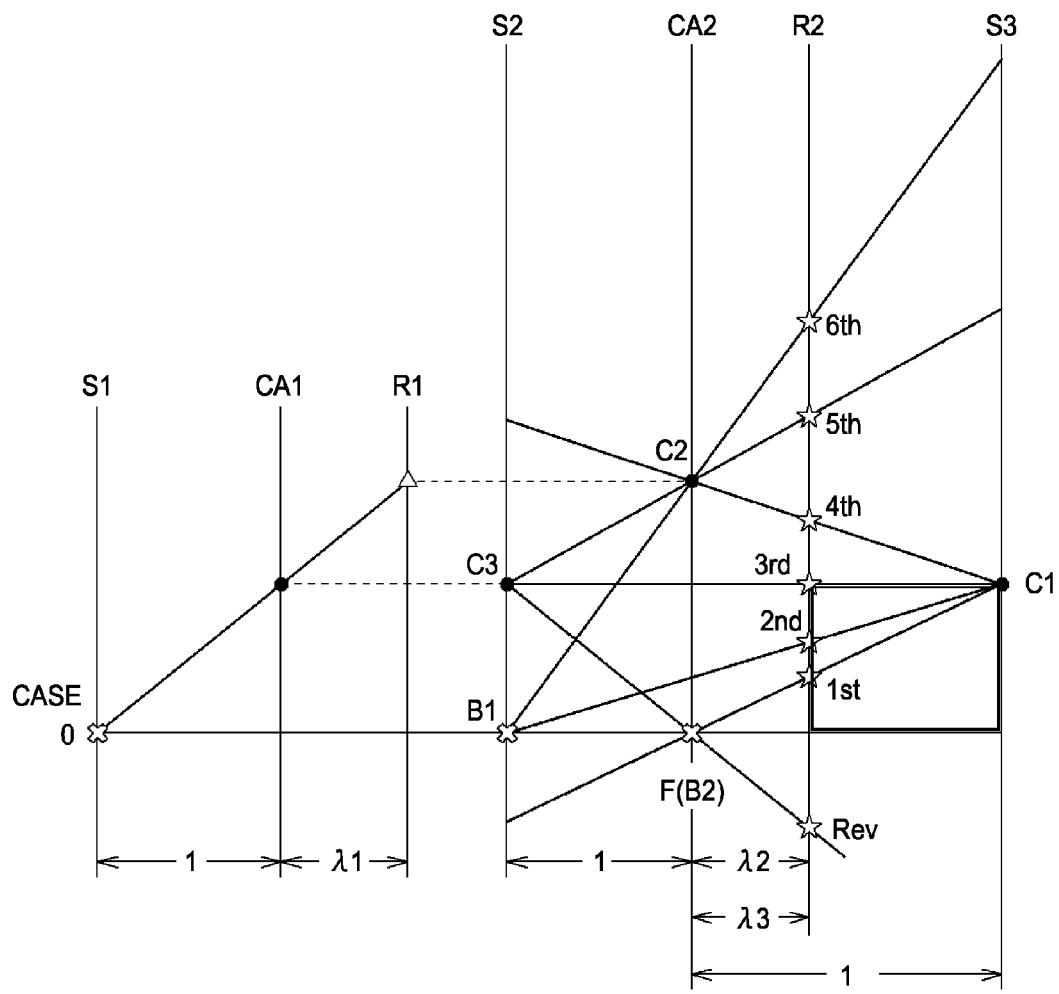
FIG. 3 is an operation table illustrating the operating state of a plurality of engagement elements at each shift speed of a speed change mechanism according to the embodiment of the present invention.
FIG. 4 is a velocity diagram of the speed change mechanism according to the embodiment of the present invention.

Next, the six shift speeds established in the speed change mechanism TM will be described. FIG. 3 is an operation table illustrating the operating state of the plurality of engagement elements at each shift speed. In the drawing, the symbol "○" indicates that each engagement device is in the engaged state, and the presence of "no symbol" indicates that each engagement device is in the disengaged state. The symbol "(○)" indicates that the engagement element is in the engaged state with engine braking in operation or the like. In addition, the symbol "Δ" indicates that the engagement element is in the disengaged state in the case where the engagement element rotates in one direction (the carrier CA2 rotates in the positive direction), and that the engagement element is in the engaged state in the case where the engagement element rotates in the other direction (the carrier CA2 rotates in the negative direction).

FIG. 4 is a velocity diagram of the speed change mechanism TM. In the velocity diagram, the vertical axis corresponds to the rotational speed of each rotary element. That is, the indication "0" provided on the vertical axis indicates that the rotational speed is zero, with the upper side corresponding to positive rotation (the rotational speed is positive) and the lower side corresponding to negative rotation (the rotational speed is negative). A plurality of vertical lines disposed in parallel correspond to the respective rotary elements of the first planetary gear device P1 and the respective rotary elements of the second planetary gear device P2. That is, the symbols "S1", "CA1", and "R1" provided above the vertical lines correspond to the sun gear S1, the carrier CA1, and the ring gear R1, respectively, of the first planetary gear device P1. In addition, the symbols "S2", "CA2", "R2", and "S3" provided above the vertical lines correspond to the first sun gear S2, the carrier CA2, the ring gear R2, and the second sun gear S3, respectively, of the second planetary gear device P2. The distance between the plurality of vertical lines disposed in parallel is determined on the basis of the gear ratio λ of the planetary gear devices P1 and P2 (the tooth number ratio between the sun gear and the ring gear=[number of teeth of sun gear]/[number of teeth of ring gear]).

In addition, the symbol "Δ" indicates a state in which the rotary element is coupled to the input shaft I drivably coupled to the engine E. The symbol "x" indicates a state in which the rotary element is fixed to the case 2 through the first brake B1, the second brake B2, or the one-way clutch F. The star-shaped symbol indicates a state in which the rotary element is coupled to the output gear O drivably coupled to the wheels. The texts "1st", "2nd", "3rd", "4th", "5th", "6th", and "Rev" provided adjacent to the star-shaped symbol correspond to the first speed, the second speed, the third speed, the fourth speed, the fifth speed, the sixth speed, and the reverse speed, respectively, established in the speed change mechanism TM.

As illustrated in FIGS. 3 and 4, the first speed is established through cooperation between engagement of the first clutch C1 and the one-way clutch F. That is, with the first clutch C1 engaged, the rotational drive force of the input shaft I (engine E) input to the ring gear R1 of the first planetary gear device P1 is reduced in speed on the basis of the gear ratio λ1 to be transferred to the second sun gear S3 of the second planetary gear device P2. With the first clutch C1 engaged, when a rotational drive force is transferred from the input shaft I (engine E) to the output gear O to cause negative rotation of the carrier CA2 of the second planetary gear device P2, the one-way clutch F is engaged so that the carrier CA2 is fixed to the case 2, and the rotational drive force of the second sun gear S3 is reduced in speed on the basis of the gear ratio λ3 to be transferred to the output gear O. When a rotational drive force is transferred from the output gear O to the input shaft I (engine E) to cause positive rotation of the carrier CA2 of the second planetary gear device P2, the one-way clutch F is disengaged. When the first speed is established in this way, a rotational drive force is transferred from the input shaft I (engine E) to the output gear O, and a rotational drive force is not transferred from the output gear O to the input shaft I (engine E).

In addition, the first speed is also established through cooperation between engagement of the first clutch C1 and engagement of the second brake B2. In the embodiment, the second brake B2 is engaged when engine braking is in operation or the like to establish the first speed even if the one-way clutch F idles and is not engaged. Specifically, with the first clutch C1 engaged, the rotational drive force of the input shaft I (engine E) is reduced in speed on the basis of the gear ratio λ1 to be transferred to the second sun gear S3 of the second planetary gear device P2. In addition, with the second brake B2 engaged, the carrier CA2 of the second planetary gear device P2 is fixed to the case 2. The rotational drive force of the second sun gear S3 is further reduced in speed on the basis of the gear ratio λ3 to be transferred to the output gear O.

The second speed is established through cooperation between engagement of the first clutch C1 and engagement of the first brake B1. That is, with the first clutch C1 engaged, the rotational drive force of the input shaft I (engine E) is reduced in speed on the basis of the gear ratio λ1 to be transferred to the second sun gear S3 of the second planetary gear device P2. In addition, with the first brake B1 engaged, the first sun gear S2 of the second planetary gear device P2 is fixed to the case 2. The rotational drive force of the second sun gear S3 is further reduced in speed on the basis of the gear ratios λ2 and λ3 to be transferred to the output gear O.

The third speed is established through cooperation between engagement of the first clutch C1 and engagement of the third clutch C3. That is, with the first clutch C1 engaged, the rotational drive force of the input shaft I (engine E) is reduced in speed on the basis of the gear ratio λ1 to be transferred to the second sun gear S3 of the second planetary gear device P2. In addition, with the third clutch C3 engaged, the rotational drive force of the input shaft I (engine E) is reduced in speed on the basis of the gear ratio λ1 to be transferred to the first sun gear S2 of the second planetary gear device P2. With the first sun gear S2 and the second sun gear S3 rotating at the same speed as each other, the rotational drive force of the input shaft I (engine E) which has been reduced in speed on the basis of the gear ratio λ1 is transferred as it is to the output gear O.

The fourth speed is established through cooperation between engagement of the first clutch C1 and engagement of the second clutch C2. That is, with the first clutch C1 engaged, the rotational drive force of the input shaft I (engine E) is reduced in speed on the basis of the gear ratio λ1 to be transferred to the second sun gear S3 of the second planetary gear device P2. In addition, with the second clutch C2 engaged, the rotational drive force of the input shaft I (engine E) is transferred as it is to the carrier CA2 of the second planetary gear device P2. The rotational drive force of the input shaft I (engine E), which is determined on the basis of the respective rotational speeds of the carrier CA2 and the second sun gear S3 and the gear ratio λ3, is transferred to the output gear O.

The fifth speed is established through cooperation between engagement of the second clutch C2 and engagement of the third clutch C3. That is, with the second clutch C2 engaged, the rotational drive force of the input shaft I (engine E) is transferred as it is to the carrier CA2 of the second planetary gear device P2. In addition, with the third clutch C3 engaged, the rotational drive force of the input shaft I (engine E) is reduced in speed on the basis of the gear ratio λ1 to be transferred to the first sun gear S2 of the second planetary gear device P2. The rotational drive force of the input shaft I (engine E), which is determined on the basis of the respective rotational speeds of the first sun gear S2 and the carrier CA2 and the gear ratio λ2, is transferred to the output gear O.

The sixth speed is established through cooperation between engagement of the second clutch C2 and engagement of the first brake B1. That is, with the second clutch C2 engaged, the rotational drive force of the input shaft I (engine E) is transferred as it is to the carrier CA2 of the second planetary gear device P2. In addition, with the first brake B1 engaged, the first sun gear S2 of the second planetary gear device P2 is fixed to the case 2. The rotational drive force of the carrier CA2 is increased in speed on the basis of the gear ratio λ2 to be transferred to the output gear O.

The reverse speed is established through cooperation between engagement of the third clutch C3 and engagement of the second brake B2. That is, with the third clutch C3 engaged, the rotational drive force of the input shaft I (engine E) is reduced in speed on the basis of the gear ratio λ1 to be transferred to the first sun gear S2 of the second planetary gear device P2. In addition, with the second brake B2 engaged, the carrier CA2 of the second planetary gear device P2 is fixed to the case 2. The rotational drive force of the first sun gear S2 is reduced in speed on the basis of the gear ratio λ2 and reversed in rotational direction to be transferred to the output gear O.

As described above, the speed change mechanism TM according to the embodiment includes the first speed, the second speed, the third speed, and the fourth speed at least as shift speeds established through engagement of the first clutch C1. In addition, the speed change mechanism TM includes the fourth speed, the fifth speed, and the sixth speed at least as shift speeds established through engagement of the second clutch C2. The shift speeds form a sequence of the first speed, the second speed, the third speed, the fourth speed, the fifth speed, and the sixth speed when arranged in the descending order of the speed ratio (speed reduction ratio) between the input shaft I (engine E) and the output gear O.

2. Configuration of Hydraulic Control System

Next, a hydraulic control system of the vehicle drive device 1 will be described. As illustrated in FIGS. 2 and 5, the hydraulic control system includes two types of pumps, namely the mechanical pump MP and the electric pump EP, each serving as a hydraulic pressure source that suctions working oil accumulated in an oil pan OP to supply the working oil to various components of the vehicle drive device 1. Here, the mechanical pump MP is an oil pump driven by the rotational drive force of the engine E serving as a drive force source to discharge working oil. A gear pump, a vane pump, or the like, for example, may be suitably used as the mechanical pump MP. In the example, as illustrated in FIG. 2, the mechanical pump MP is disposed on the opposite side of the torque converter 11 from the engine E in the axial direction of the input shaft I. The mechanical pump MP is drivably coupled to the engine output shaft Eo via the pump impeller 11a of the torque converter 11, and driven by the rotational drive force of the engine E. The mechanical pump MP basically has a discharge capacity that sufficiently exceeds the amount of working oil required for the vehicle drive device 1. However, the mechanical pump MP does not discharge working oil while the engine E is stopped. Thus, the vehicle drive device 1 includes the electric pump EP serving as a pump that assists the mechanical pump MP.

The electric pump EP is an oil pump driven by the rotational drive force of an electric motor 23 to discharge working oil irrespective of the rotational drive force of the engine E serving as a drive force source. A gear pump, a vane pump, or the like, for example, may also be suitably used as the electric pump EP. The electric motor 23 which drives the electric pump EP is electrically connected to the battery 24, and produces a drive force using electric power supplied from the battery 24. The electric pump EP is a pump that assists the mechanical pump MP, and operates when a required amount of oil is not supplied from the mechanical pump MP while the engine E is stopped.

The hydraulic control system also includes the hydraulic control device PC which regulates the hydraulic pressure of working oil supplied from the mechanical pump MP and the electric pump EP to a predetermined pressure. As illustrated in FIG. 5, the hydraulic control device PC includes a first regulation valve (primary regulator valve) PV and a second regulation valve (secondary regulator valve) SV as regulation valves that regulate the hydraulic pressure of working oil supplied from the mechanical pump MP and the electric pump EP to a predetermined pressure. The first regulation valve PV is a regulation valve that regulates the hydraulic pressure of working oil supplied from the mechanical pump MP and the electric pump EP to a first hydraulic pressure PR1. The second regulation valve SV is a regulation valve that regulates the hydraulic pressure of extra oil from the first regulation valve PV to a second hydraulic pressure PR2.

Thus, the second hydraulic pressure PR2 is set to be lower than the first hydraulic pressure PR1. The first hydraulic pressure PR1 corresponds to a line pressure serving as a reference hydraulic pressure for the vehicle drive device 1, and the value of the first hydraulic pressure PR1 is decided on the basis of a signal pressure supplied from a linear solenoid valve SLT.

As illustrated in FIG. 5, a common signal pressure from the linear solenoid valve SLT for hydraulic pressure regulation is supplied to the first regulation valve PV and the second regulation valve SV. The first regulation valve PV regulates the hydraulic pressure of working oil upstream of the first regulation valve PV (on the mechanical pump MP and electric pump EP side) supplied from the mechanical pump MP and the electric pump EP to the first hydraulic pressure PR1 in accordance with the supplied signal pressure. The first regulation valve PV regulates the amount of working oil which has been supplied from the mechanical pump MP and the electric pump EP and is to be discharged to the second regulation valve SV side on the basis of the balance between the signal pressure supplied from the linear solenoid valve SLT and a feedback pressure of the first hydraulic pressure PR1 obtained after being regulated by the first regulation valve PV. Consequently, the hydraulic pressure of working oil upstream of the first regulation valve PV is regulated to the first hydraulic pressure PR1 matching the signal pressure.

The second regulation valve SV regulates the hydraulic pressure of extra oil discharged from the first regulation valve PV, that is, the hydraulic pressure of working oil downstream of the first regulation valve PV (on the second regulation valve SV side) and upstream of the second regulation valve SV (on the first regulation valve PV side), to the predetermined second hydraulic pressure PR2 in accordance with the signal pressure supplied from the linear solenoid valve SLT. The second regulation valve SV regulates the amount of extra working oil which has been discharged from the first regulation valve PV and is to be discharged (drained) to the oil pan on the basis of the balance between the signal pressure supplied from the linear solenoid valve SLT and a feedback pressure of the second hydraulic pressure PR2 obtained after being regulated by the second regulation valve SV. Consequently, the hydraulic pressure of working oil upstream of the second regulation valve SV is regulated to the second hydraulic pressure PR2 matching the signal pressure.

The linear solenoid valve SLT receives supply of working oil at the first hydraulic pressure PR1 obtained after being regulated by the first regulation valve PV, and has the operation amount of the valve regulated in accordance with a signal value supplied from the control device 30 to output working oil at a signal pressure matching the signal value. The working oil at the signal pressure output from the linear solenoid valve SLT is supplied to the first regulation valve PV and the second regulation valve SV. The control device 30 controls the first regulation valve PV and the second regulation valve SV using the signal value supplied to the linear solenoid valve SLT so as to achieve the first hydraulic pressure PR1 and the second hydraulic pressure PR2.

The hydraulic control device PC includes the linear solenoid valves SLC1, SLC4, . . . that each regulate a hydraulic pressure to be supplied to corresponding one of the engagement elements C1, B1, . . . of the speed change mechanism TM. In the embodiment, the first linear solenoid valve SLC1, the second linear solenoid valve SLC2, the third linear solenoid valve SLC3, the fourth linear solenoid valve SLC4, and the fifth linear solenoid valve SLC5 are provided for the first clutch C1, the second clutch C2, the third clutch C3, the first brake B1, and the second brake B2, respectively. The linear solenoid valves SLC1, SLC4, . . . each receive supply of working oil at the first hydraulic pressure PR1 obtained after being regulated by the first regulation valve PV, and each regulate the operation amount of the valve in accordance with a signal value supplied from the control device 30 to each of the linear solenoid valves SLC1, SLC4, . . . , to supply corresponding one of the engagement elements C1, B1, . . . with working oil at a hydraulic pressure matching the signal value.

The hydraulic control device PC includes a linear solenoid valve SLV which regulates a hydraulic pressure to be supplied to the lock-up clutch LC. The linear solenoid valve SLV receives supply of working oil at the first hydraulic pressure PR1, and regulates the operation amount of the valve in accordance with a signal value supplied from the control device 30 to supply the lock-up clutch LC with working oil at a hydraulic pressure matching the signal value.

In the embodiment, the signal values supplied from the control device 30 to the linear solenoid valves SLT, SLC1, SLC4, . . . , and SLV are current values. The hydraulic pressures output from the linear solenoid valves SLT, SLC1, SLC4, . . . , and SLV are basically proportional to the current values supplied from the control device 30.

Working oil at the second hydraulic pressure PR2 obtained after being regulated by the second regulation valve SV is supplied to lubricate or cool various gears etc. of the speed change mechanism TM, or supplied as working oil to be charged in the torque converter 11.

3. Configuration of Control Device 30

Next, the configuration of the control device 30 which controls the vehicle drive device 1 and the engine control device 31 will be described with reference to FIG. 6.

The control units 32 to 34 of the control device 30 and the engine control device 31 each include an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth. Functional sections 41 to 47 of the control device 30 etc. are formed by software (a program) stored in the ROM of the control device or the like, hardware such as a separately provided arithmetic circuit, or a combination of both. The control units 32 to 34 of the control device 30 and the engine control device 31 are configured to communicate with each other, share various information such as information detected by sensors and control parameters, and perform cooperative control, thereby implementing the functions of the functional sections 41 to 47.

The vehicle drive device 1 includes sensors Se1 to Se3 that each output an electrical signal to be input to the control device 30 and the engine control device 31. The control device 30 and the engine control device 31 calculate information detected by each of the sensors on the basis of the input electrical signal.

An input rotational speed sensor Se1 is a sensor that detects the rotational speed of the input shaft I. The power transfer control unit 33 detects the rotational speed of the input shaft I on the basis of a signal input from the input rotational speed sensor Se1.

An output rotational speed sensor Se2 is a sensor that detects the rotational speed of the output gear O. The power transfer control unit 33 detects the rotational speed of the output gear O on the basis of a signal input from the output rotational speed sensor Se2. The rotational speed of the output gear O is proportional to the vehicle speed. Therefore, the power transfer control unit 33 calculates the vehicle speed on the basis of the signal input from the output rotational speed sensor Se2. An engine rotational speed sensor Se3 is a sensor that detects the rotational speed of the engine output shaft Eo (engine E). The engine control device 31 detects the rotational speed of the engine E on the basis of a signal input from the engine rotational speed sensor Se3.

3-1. Engine Control Device 31

The engine control device 31 includes an engine control section 41 that controls operation of the engine E. In the embodiment, in the case where a command for engine required torque is provided from the vehicle control unit 34, the engine control section 41 performs torque control in which an output torque command value is set to the engine required torque according to the command provided from the vehicle control unit 34, and in which the engine E is controlled so as to output torque corresponding to the output torque command value. In the case where a request to stop the engine E is provided, meanwhile, the engine control device 31 stops supply of fuel to the engine E to control the engine E into an operation stopped state.

3-3. Rotary Electric Machine Control Unit 32

The rotary electric machine control unit 32 includes a rotary electric machine control section 42 that controls operation of the rotary electric machine MG. In the embodiment, in the case where a command for rotary electric machine required torque is provided from the vehicle control unit 34, the rotary electric machine control section 42 sets an output torque command value to the rotary electric machine required torque according to the command provided from the vehicle control unit 34, and controls the rotary electric machine MG so that the rotary electric machine MG outputs torque at the output torque command value. Specifically, the rotary electric machine control section 42 controls the output torque of the rotary electric machine MG by turning on and off a plurality of switching elements provided in the inverter.

3-3. Power Transfer Control Unit 33

The power transfer control unit 33 includes a speed change mechanism control section 43 that controls the speed change mechanism TM, a lock-up clutch control section 44 that controls the lock-up clutch LC, and an actuator control section 45 that controls actuators that control the engagement/disengagement state of the engagement elements C1, B1, . . . and the lock-up clutch LC of the speed change mechanism TM.

3-3-1. Speed Change Mechanism Control Section 43

The speed change mechanism control section 43 is a functional section that controls the speed change mechanism TM. The speed change mechanism control section 43 decides a target shift speed for the speed change mechanism TM on the basis of information detected by the sensors such as the vehicle speed, the accelerator operation amount, and the shift position. The speed change mechanism control section 43 controls a hydraulic pressure to be supplied to the engagement elements C1, B1, . . . provided in the speed change mechanism TM via the hydraulic control device PC so as to engage or disengage the engagement elements C1, B1, . . . and establish the target shift speed in the speed change mechanism TM. Specifically, the speed change mechanism control section 43 controls the hydraulic pressure to be supplied by providing the actuator control section 45 with a command signal value for the actuators for the engagement elements C1, B1, . . . .

The speed change mechanism control section 43 references a speed change map stored in a memory to decide the target shift speed. The speed change map is a map that defines the relationship between the accelerator operation amount and the vehicle speed, and the target shift speed for the speed change mechanism TM. The speed change map includes a plurality of up shift lines and a plurality of downshift lines. When the vehicle speed and the accelerator operation amount are varied so that an upshift line or a downshift line is crossed on the speed change map, the speed change mechanism control section 43 decides a new target shift speed for the speed change mechanism TM. The target shift speed is also changed in the case where the shift position is changed. For example, the target shift speed may be changed in the case where the shift position is changed to the second range or the low range. Here, the term "upshift" means switching from a shift speed with a higher speed ratio to a shift speed with a lower speed ratio. The term "downshift" means switching from a shift speed with a lower speed ratio to a shift speed with a higher speed ratio.

The speed change mechanism control section 43 controls respective hydraulic pressures to be supplied to the plurality of engagement elements C1, B1, . . . in accordance with the new target shift speed to switch between shift speeds in the speed change mechanism TM. In this event, the speed change mechanism control section 43 disengages a disengagement-side element and engages an engagement-side element. For example, in the case where a downshift is performed, the speed change mechanism control section 43 performs downshift control in which the disengagement-side element, which is one of friction engagement elements for establishing the higher shift speed, is disengaged and the engagement-side element, which is one of friction engagement elements for establishing the lower shift speed, is engaged.

3-3-2. Lock-Up Clutch Control Section 44

The lock-up clutch control section 44 is a functional section that controls the engagement/disengagement state of the lock-up clutch LC. Here, the lock-up clutch control section 44 controls a hydraulic pressure to be supplied to the lock-up clutch LC via the hydraulic control device PC to control engagement or disengagement of the lock-up clutch LC. Specifically, the lock-up clutch control section 44 controls the hydraulic pressure to be supplied by providing the actuator control section 45 with a command for a command signal value for the actuator for the lock-up clutch LC.

3-3-3. Actuator Control Section 45

The actuator control section 45 is a functional section that controls the actuators provided to control the engagement/disengagement state of the engagement elements C1, B1, . . . of the speed change mechanism TM and the lock-up clutch LC. The actuator control section 45 includes signal controllers corresponding to the actuators. The signal controllers for the actuators each control a signal value supplied to the corresponding actuator on the basis of a command signal value provided from other control sections such as the speed change mechanism control section 43, the lock-up clutch control section 44, and the neutral travel control section 46.

In the embodiment, as illustrated in FIG. 5, the linear solenoid valves SLC1, SLC4, . . . , and SLV are provided in association with the engagement elements C1, B1, . . . , and LC, respectively, and the signal controllers of the actuator control section 45 are each configured to control a current value as the signal value to be supplied to corresponding one of the linear solenoid valves SLC1, SLC4, . . . , and SLV. The actuator control section 45 includes, as the signal controllers, current feedback controllers that each perform feedback control such that the current value approaches the command current value. The actuator control section 45 includes current sensors that each detect the current value to be supplied to corresponding one of the linear solenoid valves SLC1, SLC4, . . . , and SLV. That is, the current feedback controllers for the linear solenoid valves are configured to perform feedback control on the current values to be supplied to the linear solenoid valves on the basis of the command current values provided to the linear solenoid valves.

3-4. Vehicle Control Unit 34

The vehicle control unit 34 includes functional sections that control integration of various torque control performed on the engine E, the rotary electric machine MG, the speed change mechanism TM, and so forth, engagement control for the plurality of engagement elements C1, B1, . . . provided in the speed change mechanism TM and the lock-up clutch LC, and so forth over the entire vehicle.

The vehicle control unit 34 calculates vehicle required torque, which is a target drive force to be transferred from the drive force sources including the engine E and the rotary electric machine MG to the wheels 6, and decides the operation mode of the engine E and the rotary electric machine MG, in accordance with the accelerator operation amount serving as a required drive force for the wheels 6, the vehicle speed, the charge amount of the battery, and so forth. The vehicle control unit 34 is a functional section that calculates the engine required torque, which is output torque required for the engine E, and the rotary electric machine required torque, which is output torque required for the rotary electric machine MG, and provides the calculated values to the other control units 32 and 33 and the engine control device 31 for integration control.

In the embodiment, examples of the operation mode include an electric mode in which only the rotary electric machine MG is used as the drive force source, a parallel mode in which at least the engine E is used as the drive force source, a regenerative power generation mode in which a rotational drive force transferred from the wheels 6 is used for regenerative power generation performed by the rotary electric machine MG, and an engine power generation mode in which a rotational drive force of the engine E is used for regenerative power generation performed by the rotary electric machine MG.

In the embodiment, the vehicle control unit 34 includes the neutral travel control section 46 and the determination section 47.

The neutral travel control section 46 and the determination section 47 will be described in detail below.

3-4-1. Neutral Travel Control Section 46 and Determination Section 47

The neutral travel control section 46 is a functional section that performs neutral travel control. In the neutral travel control, disengagement engagement elements, which are at least some of the plurality of engagement elements C1, B1, . . . , are disengaged with the wheels 6 rotating, thereby the state of the speed change mechanism TM is controlled into a neutral state where transfer of a drive force between the input shaft I and the output gear O is not performed, and the wheels 6 are driven by the drive force of the rotary electric machine MG.

The determination section 47 is a functional section that compares an operation indication value that represents the operating state of each of target actuators, which are actuators that control the engagement/disengagement state of each of the disengagement engagement elements, and a determination value set in association with each of the target actuators such that wheel transfer torque, which is transferred from the speed change mechanism TM to the wheels 6 because of transfer torque transferred by each of the disengagement engagement elements, falls within an allowable range during execution of the neutral travel control, and then the determination section 47 performs allowable transfer torque determination in which it is determined on the basis of the comparison results whether or not the wheel transfer torque transferred from the speed change mechanism TM to the wheels 6 falls within the allowable range.

In the embodiment, the determination section 47 is configured to determine that the wheel transfer torque does not fall within the allowable range also in the case where the rotational speed of the input shaft I or the engine E is raised to a predetermined rotational speed, in addition to the determination based on the comparison between the operation indication value and the determination value.

In the embodiment, in addition, the neutral travel control section 46 is configured to control at least target actuators, the operation indication values for which are equal to or more than the respective determination values, into a disengaged state in the case where the determination section 47 determines that the wheel transfer torque does not fall within the allowable range.

The neutral travel control and the allowable transfer torque determination will be described in detail below with reference to the time chart illustrated in FIG. 7.

In the embodiment, the neutral travel control section 46 is configured to perform the neutral travel control in the case where the operation mode is decided to be the electric mode. That is, the rotary electric machine MG is drivably coupled to the wheels 6 not via the speed change mechanism TM. Thus, the neutral travel control section 46 is configured to control the speed change mechanism TM into the neutral state and to disconnect the engine E from the wheels 6 in the case where the electric mode in which only the rotary electric machine MG is used as the drive force source is performed.

The neutral travel control section 46 is configured to stop supply of fuel to the engine E and to control the engine E into an operation stopped state in order to suppress fuel consumption by the engine E while the speed change mechanism TM is controlled into the neutral state.

In the example illustrated in FIG. 7, the rotational speed of the output gear O drivably coupled to the wheels 6 is more than 0, the wheels 6 are rotated, and the vehicle speed is more than 0. Before time t01, the operation mode is decided to be the parallel mode, and the engine E and the rotary electric machine MG are used as drive force sources. In order that the drive force of the engine E is transferred to the wheels 6, a shift speed is established in the speed change mechanism TM. In the example illustrated in FIG. 7, the first clutch C1 and the first brake B1 are engaged to establish the second speed (see FIG. 3). A current is supplied to the first linear solenoid valve SLC1 to engage the first clutch C1. A current is supplied to the fourth linear solenoid valve SLC4 to engage the first brake B1. In addition, the lock-up clutch LC is disengaged, and there is a rotational speed difference between the rotational speed of the engine E which is a rotational speed on the input side of the torque converter 11 and the rotational speed of the input shaft I which is a rotational speed on the output side of the torque converter 11.

At time t02, the operation mode is changed from the parallel mode to the electric mode. In the embodiment, when controlling the speed change mechanism TM into the neutral state, the neutral travel control section 46 disengages one of engagement elements engaged to establish a predetermined shift speed established when the neutral state is ended as the disengagement engagement element, and engages the rest of the engagement elements (hereinafter referred to also as "preparation engagement elements") engaged to establish the predetermined shift speed excluding the disengagement engagement element. Engagement elements of the speed change mechanism TM other than the engagement elements engaged to establish the predetermined shift speed are also disengaged as the disengagement engagement elements. That is, the neutral travel control section 46 is configured to engage preparation engagement elements other than the one disengagement engagement element determined in advance, among the engagement elements engaged to establish the predetermined shift speed established when the neutral state is ended, and to disengage engagement elements other than the preparation engagement elements, among the plurality of engagement elements provided in the speed change mechanism TM, as the disengagement engagement elements. Specifically, the neutral travel control section 46 controls the engagement/disengagement state of each of the engagement elements C1, B1, . . . by providing the actuator control section 45 with a command signal value for the corresponding actuator which controls the engagement/disengagement state of corresponding one of the engagement elements C1, B1, . . . . The predetermined shift speed established when the neutral state is ended is decided in accordance with at least the vehicle speed.

As illustrated in the operation table of FIG. 3, each shift speed to be established in the speed change mechanism TM according to the embodiment is established through engagement of two of the plurality of engagement elements C1, B1, . . . . Therefore, the preparation engagement element is one of the engagement elements, and the disengagement engagement element is the other engagement element.

In the example illustrated in FIG. 7, the shift speed that may be established when the neutral travel control is ended is one of the first speed to the fourth speed, and thus the neutral travel control section 46 sets the first clutch C1, which is an engagement element commonly engaged to establish the first speed to the fourth speed, as the preparation engagement element, and keeps the first clutch C1 engaged also during the neutral travel control. The neutral travel control section 46 sets the second clutch C2, the third clutch C3, the first brake B1, and the second brake B2, which are engagement elements other than the first clutch C1 set as the preparation engagement element, as the disengagement engagement elements, and disengages the second clutch C2, the third clutch C3, the first brake B1, and the second brake B2.

In the case where the shift speed that may be established when the neutral travel control is ended is one of the fourth speed to the sixth speed unlike the example illustrated in FIG. 7, the neutral travel control section 46 sets the second clutch C2, which is commonly engaged to establish the fourth speed to the sixth speed, as the preparation engagement element. The neutral travel control section 46 sets the first clutch C1, the third clutch C3, the first brake B1, and the second brake B2, which are other than the second clutch C2 set as the preparation engagement element, as the disengagement engagement elements.

Hence, as illustrated in the example of FIG. 7, after the neutral travel control is started at time t01, the neutral travel control section 46 decreases a current value supplied to the fourth linear solenoid valve SLC4 to bring the first brake B1, which is set as the disengagement engagement element, from the engaged state into the disengaged state until the first brake B1 is disengaged. In the example illustrated in FIG. 7, the current value supplied to the fourth linear solenoid valve SLC4 is decreased to zero. However, the current value may be decreased to a predetermined current value that is more than zero and that corresponds to a hydraulic pressure that is less than a stroke end pressure. In FIG. 7, current values supplied to the linear solenoid valves corresponding to the disengagement engagement elements C2, C3, and B2 other than the first brake B1 are not indicated. However, the current values are also decreased to around zero so that the disengagement engagement elements C2, C3, and B2 are disengaged.

After the current value supplied to the fourth linear solenoid valve SLC4 is decreased and the speed change mechanism TM is brought into the neutral state, the neutral travel control section 46 stops supply of fuel to the engine E (time t02). When supply of fuel to the engine E is stopped with the speed change mechanism TM in the neutral state, the rotational speed of the engine E is lowered to zero, and the rotational speed of the input shaft I is also lowered to zero via the torque converter 11 (time t03).

When transfer torque (transfer torque capacity) of the disengagement engagement element is increased with the output gear O rotating and with the rotational speed of the input shaft I and the rotational speed of the engine E lowered, negative torque (braking torque) is transferred from the speed change mechanism TM to the wheels 6 in accordance with the transfer torque of the disengagement engagement element, and positive torque is transferred from the speed change mechanism TM to the input shaft I as a reaction force. In the embodiment, the determination section 47 is configured to determine that conditions for executing allowable transfer torque determination are met and start allowable transfer torque determination when the speed change mechanism TM is brought into the neutral state and the rotational speed of the input shaft I or the rotational speed of the engine E is lowered to zero (time t03). When a signal value is supplied to the target actuator for the disengagement engagement element and the transfer torque capacity of the disengagement engagement element is increased, the disengagement engagement element is brought into the slipping engagement state, and transfers torque matching the transfer torque capacity.

3-4-1-1. Allowable Transfer Torque Determination

As described above, the determination section 47 compares the operation indication value for each of the target actuators and the determination value for each of the target actuators during execution of neutral travel control, and performs allowable transfer torque determination in which it is determined on the basis of the comparison results whether or not the wheel transfer torque transferred from the speed change mechanism TM to the wheels 6 falls within the allowable range.

<Setting of Allowable Range of Wheel Transfer Torque>

The determination value set in association with each of the target actuators is a determination threshold for the operation indication value, and is set in association with each of the target actuators such that wheel transfer torque transferred from the speed change mechanism TM to the wheels 6 because of transfer torque transferred through each of the disengagement engagement elements falls within an allowable range.

In the embodiment, the determination value set in association with each of the target actuators is set on the basis of allowable wheel transfer torque Twmx determined in advance as torque allowed to be transferred from the speed change mechanism TM to the wheels 6 during neutral travel.

Specifically, the determination value is set on the basis of the operation indication value corresponding to transfer torque (hereinafter referred to also as "allowable disengagement transfer torque") of the disengagement engagement element, which is required for the allowable wheel transfer torque Twmx to be transferred to the wheels 6 at a shift speed (hereinafter referred to also as an "estimated established shift speed") that may be established in the case where the disengagement engagement element corresponding to the determination value, is engaged.

The allowable wheel transfer torque Twmx is set to negative torque (braking torque) with the maximum allowable magnitude. The allowable wheel transfer torque Twmx is set in consideration of the safety standards for the vehicle and an uncomfortable feeling given to the driver. For example, in the case where a consideration is given to the safety standards for the vehicle, the allowable wheel transfer torque Twmx is set on the basis of braking torque (hereinafter referred to also as "lock braking torque") at which rotation of the wheels 6 may be locked with the wheels 6 slipping with respect to the road surface. For example, the allowable wheel transfer torque Twmx is set to torque obtained by multiplying the lock braking torque by a predetermined safety factor that is less than 1. In short, the allowable wheel transfer torque Twmx is set to such braking torque that will not cause abrupt braking.

<Operation Indication Value>

In the embodiment, the operation indication value which represents the operating state of the target actuator is either a signal value supplied to the target actuator or an element transfer torque value indicating torque transferred by the disengagement engagement element. In the following, a case where the operation indication value is a signal value and a case where the operation indication value is an element transfer torque value will be described separately.

3-4-1-1-1. Case with Operation Indication Value=Signal Value

First, a case where the operation indication value for the target actuator is a signal value supplied to the target actuator will be described.

In the embodiment, the signal value supplied to the target actuator is a current value supplied to the linear solenoid valve which controls the engagement/disengagement state of the disengagement engagement element.

<Setting of Determination Value>

In this case, the determination value set in association with each of the disengagement engagement elements is set on the basis of the allowable wheel transfer torque Twmx, and set on the basis of a signal value (current value) corresponding to transfer torque (allowable disengagement transfer torque) of the disengagement engagement element, which is required for the allowable wheel transfer torque Twmx to be transferred to the wheels at the estimated established shift speed which may be established in the case where the disengagement engagement element corresponding to the determination value, is engaged.

In the speed change mechanism TM according to the embodiment, as described above, the first clutch C1 or the second clutch C2 is set as the preparation engagement element, and engaged during neutral travel. As illustrated in the operation table of FIG. 3, in the case where the first clutch C1 is set as the preparation engagement element, the estimated established shift speed which may be established in the case where one of the disengagement engagement elements C2, C3, B1, and B2 is engaged is the fourth speed, the third speed, the second speed, and the first speed, respectively. In the case where the second clutch C2 is set as the preparation engagement element, the estimated established shift speed which may be established in the case where one of the disengagement engagement elements C1, C3, B1, and B2 is engaged is the fourth speed, the fifth speed, the sixth speed, and "none", respectively.

Here, the relationship between transfer torque of the disengagement engagement element and wheel transfer torque at the estimated established shift speed will be described.

First, basic relational formulas will be described.

The relationship between input torque Tin transferred from the input shaft I to the speed change mechanism TM and output torque To transferred from the speed change mechanism TM to the output gear O is represented using a speed ratio Kr of the established shift speed by the following formula:

$$To = Kr \times Tin \quad (1)$$

The relationship between the output torque To and wheel transfer torque Tw transferred from the output gear O to the wheels 6 is represented using a final gear ratio Kw, which is the speed ratio between the output gear O and the wheels 6, by the following formula:

$$Tw = Kw \times To \quad (2)$$

In addition, torque Te that acts on each engagement element engaged to establish a shift speed in accordance with the input torque Tin is represented using a torque distribution ratio Ke for each engagement element, which is determined in accordance with the gear ratio of each gear mechanism which establishes the shift speed, by the following formula:

$$Te = Ke \times Tin \quad (3)$$

Here, the torque distribution ratio is varied for each engagement element engaged to establish each shift speed.

The basic formulas of the formula (1) to the formula (3) are used to derive a formula for calculating wheel transfer torque from transfer torque of the disengagement engagement element at the estimated established shift speed.

From the formula (3), input torque Tinf that acts on the input shaft I in accordance with transfer torque Tef in the case where the transfer torque Tef is produced in the disengagement engagement element is represented using a torque distribution ratio Kef for the disengagement engagement element at the estimated established shift speed, which may be established in the case where the disengagement engagement element is engaged, by the following formula:

$$Tinf = 1/Kef \times Tef \quad (4)$$

Here, it is assumed that friction torque of the engine E is produced in accordance with the input torque Tinf produced by the disengagement engagement element. That is, it is assumed that a portion of the speed change mechanism TM on the input shaft I side is supported by friction torque of the engine E.

From the formula (4), the formula (1), and the formula (2), wheel transfer torque Twf transferred to the wheels via the output gear O in accordance with the input torque Tinf produced in accordance with the transfer torque Tef of the disengagement engagement element is represented by the following formula:

$$\begin{aligned} Twf &= Kw \times Krf \times Tinf \\ &= Kw \times Krf / Kef \times Tef \end{aligned} \quad (5)$$

Here, Krf is the speed ratio of the estimated established shift speed.

When the formula (5) is organized for the transfer torque Tef of the disengagement engagement element, the following formula is obtained:

$$Tef=Kef/(Kw \times Krf) \times Twf \qquad (6)$$

Using the formula (6), transfer torque (allowable disengagement transfer torque) Temx of the disengagement engagement element, which is required for the allowable wheel transfer torque Twmx to be transferred to the wheels at the estimated established shift speed, can be calculated on the basis of the allowable wheel transfer torque Twmx by the following formula:

$$Temx=Kef/(Kw \times Krf) \times Twmx \qquad (7)$$

The determination value is set to a value (hereinafter referred to an "allowable signal value (current value)" Xa) obtained by converting the allowable disengagement transfer torque Temx of the disengagement engagement element into a signal value (current value) using the relationship between transfer torque (transfer torque capacity) of each engagement element and a signal value (current value) supplied to the actuator for the engagement element illustrated in FIG. 8.

Figures 9, 10:
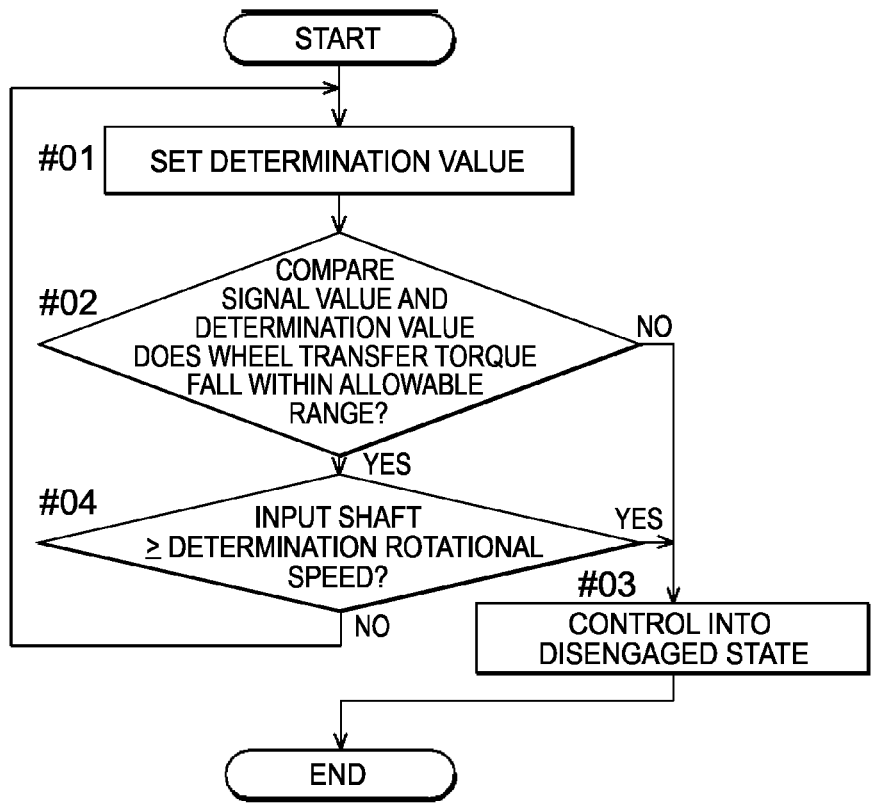
FIG. 9 illustrates the setting of a determination value according to the embodiment of the present invention.
FIG. 10 is a flowchart illustrating the process procedure for allowable transfer torque determination performed in the case where an operation indication value is a signal value.

As illustrated in FIG. 9, the allowable signal value Xa is calculated for each estimated established shift speed which may be established in the case where each disengagement engagement element is engaged for each of the preparation engagement elements C1 and C2, and set in advance.

<Allowable Transfer Torque Determination>

Next, a process for allowable transfer torque determination will be described with reference to the flowchart of FIG. 10. When conditions for execution of allowable transfer torque determination are met during execution of the neutral travel control, the determination section 47 executes a process for transfer torque capacity determination illustrated in the flowchart of FIG. 10. The process in the flowchart of FIG. 10 is executed for all the disengagement engagement elements.

In step #01, the determination section 47 sets a determination value for each target actuator. In the embodiment, as illustrated in FIG. 9, the allowable signal value Xa which is set in association with the allowable wheel transfer torque as described above at the estimated established shift speed which may be established in the case where each disengagement engagement element is engaged is selected in accordance with whether the preparation engagement element is the first clutch C1 or the second clutch C2, and set as the determination value.

For example, in the case where the preparation engagement element is the first clutch C1, the determination value for the fourth linear solenoid valve SLC4 for the first brake B1 is set to an allowable signal value Xa14 for the fourth linear solenoid valve SLC4 set in association with the allowable wheel transfer torque at the second speed established in the case where the first brake B1 is engaged. In the case where the preparation engagement element is the second clutch C2, on the other hand, the determination value for the fourth linear solenoid valve SLC4 for the first brake B1 is set to an allowable signal value Xa24 for the fourth linear solenoid valve SLC4 set in association with the allowable wheel transfer torque at the sixth speed established in the case where the first brake B1 is engaged. The determination value is also set in the same manner for the other clutches and brakes.

Next, in step #02, the determination section 47 compares a signal value (current value) for each target actuator and the determination value set in association with each target actuator, and determines that the wheel transfer torque does not fall within the allowable range in the case where there are any target actuators, the signal values (current values) for which are equal to or more than the respective determination values, and determines that the wheel transfer torque falls within the allowable range in the case where there are not any target actuators, the signal values (current values) for which are equal to or more than the respective determination values.

In the case where the determination section 47 determines that the wheel transfer torque does not fall within the allowable range (step #02: No), the neutral travel control section 46 controls at least the target actuator, the signal value (current value) for which is equal to or more than the determination value, into a disengaged state (step #03). In the embodiment, the neutral travel control section 46 resets the signal controller (current feedback controller) for the actuator control section 45 corresponding to the linear solenoid valve to be disengaged, by setting a command signal value (command current value) for the signal controller to zero or resetting control values for various sections of the signal controller, and blocks a current to the linear solenoid valve.

In the case where the determination section 47 determines in step #02 that the wheel transfer torque falls within the allowable range (step #02: Yes), the determination section 47 determines in step #04 that the wheel transfer torque does not fall within the allowable range in the case where the rotational speed of the input shaft I or the engine E is equal to or more than a predetermined determination rotational speed determined in advance, and determines that the wheel transfer torque falls within the allowable range in the case where the rotational speed is less than the determination rotational speed.

In the case where the determination section 47 determines in step #04 that the wheel transfer torque does not fall within the allowable range (step #04: No Yes), the neutral travel control section 46 controls the target actuator into a disengaged state (step #03). In this case, the target actuator which has produced transfer torque may not be specified, and thus all the target actuators are controlled into a disengaged state.

In the case where the determination section 47 determines that the wheel transfer torque falls within the allowable range (step #02: Yes, and step #04: No), on the other hand, the process returns to step #01 to perform transfer torque capacity determination again.

In the example illustrated in FIG. 7, after the allowable transfer torque determination is started at time t03, erroneous operation is caused in the current feedback controller corresponding to the fourth linear solenoid valve SLC4 at time t04, and the current value for the fourth linear solenoid valve SLC4 is increased significantly to be equal to or more than the determination value set in association with the fourth linear solenoid valve SLC4. At time t05, the determination section 47 determines that the current value for the fourth linear solenoid valve SLC4 which is the target actuator is equal to or more than the determination value for the fourth linear solenoid valve SLC4. The neutral travel control section 46 resets the current feedback controller for the fourth linear solenoid valve SLC4 to block a current to the fourth linear solenoid valve SLC4. In the example illustrated in FIG. 7, the neutral travel control section 46 is also configured to control the actuator corresponding to the preparation engagement element into a disengaged state so that torque will not be transferred to the wheels even in the case where a current to the fourth linear solenoid valve SLC4 cannot be blocked because of a failure such as a wire breakage or a short circuit, and a current to the first linear solenoid valve SLC1 is also blocked (time t05). Alternatively, the neutral travel control section 46 may be configured to control the actuators corresponding to all the engagement elements of the speed change mechanism TM into a disengaged state.

At time t04, in addition, positive torque is transferred from the speed change mechanism TM to the input shaft I as a reaction to negative wheel transfer torque transferred from the speed change mechanism TM to the wheels 6 due to an increase in current value for the fourth linear solenoid valve SLC4, and the rotational speed of the input shaft I increases. Even in the case where it cannot be determined through the comparison between the operation indication value and the determination value that the wheel transfer torque does not fall within the allowable range, the determination section 47 can determine that the wheel transfer torque does not fall within the allowable range because of a rise in rotational speed of the input shaft I or the engine E. In the example illustrated in FIG. 7, the lock-up clutch LC is disengaged, and the rotational speed of the input shaft I starts rising before the rotational speed of the engine E starts rising. The lock-up clutch LC may be configured to be controlled into an engaged state during the neutral travel control.

3-4-1-1-2. Case with Operation Indication Value=Element Transfer Torque Value

Next, a case will be described where the operation indication value for the target actuator is an element transfer torque value indicating torque transferred by the disengagement engagement element.

<Setting of Element Transfer Torque Value>

In this case, the element transfer torque value indicating torque transferred by the disengagement engagement element is a value obtained by converting the signal value supplied to the actuator for the disengagement engagement element into a disengagement transfer torque value indicating transfer torque transferred through the disengagement engagement element, and converting the disengagement transfer torque value into a wheel transfer torque value indicating torque transferred to the wheels 6 at the estimated established shift speed which may be established in the case where the disengagement engagement element is engaged.

In this case, the determination value set in association with each of the disengagement engagement elements is the allowable wheel transfer torque Twmx (absolute value) set in advance.

The wheel transfer torque Twf transferred to the wheels in accordance with the transfer torque Tef of the disengagement engagement element is represented by the formula (5) given above.

The determination section 47 calculates the transfer torque Tef of each disengagement engagement element on the basis of a signal value (current value) supplied to the actuator for each disengagement engagement element using the relationship between the signal value (current value) supplied to the actuator for each engagement element and transfer torque (transfer torque capacity) of each engagement element indicated in FIG. 8. Next, the determination section 47 calculates wheel transfer torque Twf for each disengagement engagement element on the basis of the transfer torque Tef of each disengagement engagement element using the formula (5) given above. Here, the determination section 47 decides an estimated established shift speed in accordance with the disengagement engagement elements and the preparation engagement element, and decides the speed ratio Krf of the estimated established shift speed and the torque distribution ratio Kef for each disengagement engagement element at the estimated established shift speed. The determination section 47 uses information on the speed ratio Kr of each shift speed set in advance and the torque distribution ratio Ke for each engagement element at each shift speed.

<Allowable Transfer Torque Determination>

Figure 11:
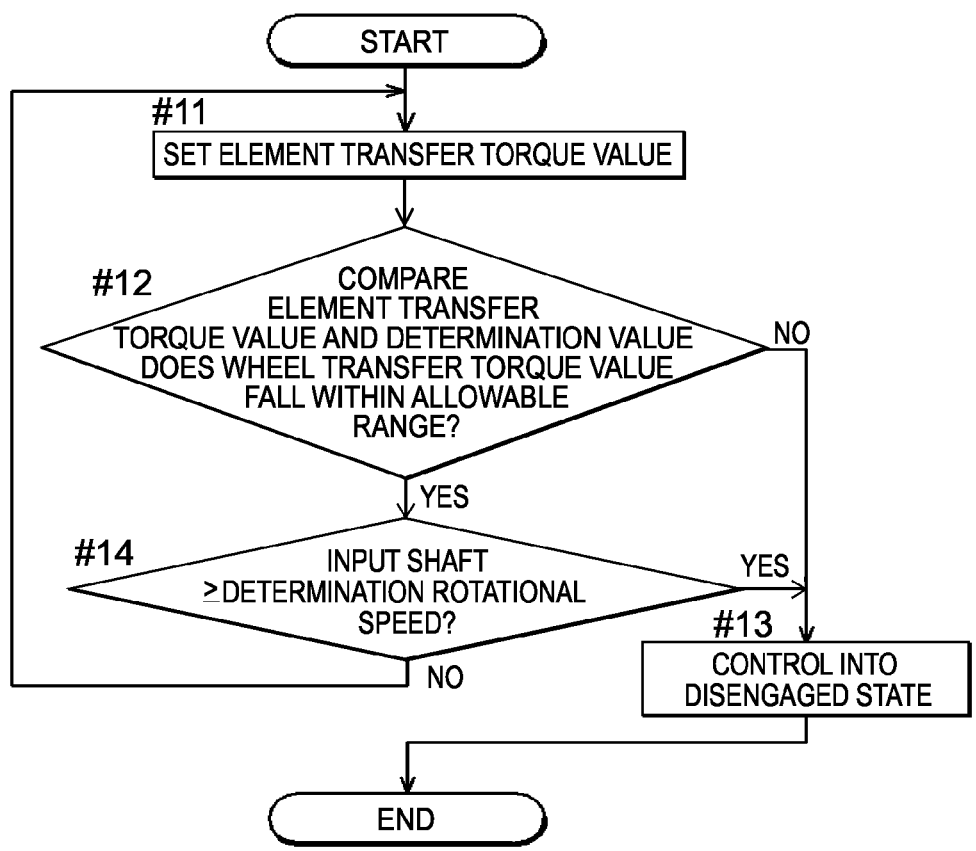
FIG. 11 is a flowchart illustrating the process procedure for the allowable transfer torque determination performed in the case where the operation indication value is an element transfer torque value.

Next, a process for allowable transfer torque determination will be described with reference to the flowchart of FIG. 11. When conditions for execution of allowable transfer torque determination are met during execution of the neutral travel control, the determination section 47 executes a process for transfer torque capacity determination illustrated in the flowchart of FIG. 11. The process in the flowchart of FIG. 11 is executed for all the disengagement engagement elements.

In step #11, the determination section 47 sets an element transfer torque value for each target actuator. In the embodiment, the wheel transfer torque Twf (absolute value) transferred by each disengagement engagement element is calculated on the basis of the signal value (current value) supplied to each target actuator as described above at the estimated established shift speed which may be established in the case where each disengagement engagement element is engaged in accordance with whether the preparation engagement element is the first clutch C1 or the second clutch C2, and set as the element transfer torque value for each target actuator.

For example, in the case where the preparation engagement element is the first clutch C1, the wheel transfer torque transferred by the first brake B1 is calculated on the basis of the signal value (current value) supplied to the fourth linear solenoid valve SLC4 by use of the speed ratio Krf of the second speed established in the case where the first brake B1 is engaged and the torque distribution ratio Kef for the first brake B1 at the second speed.

In the case where the preparation engagement element is the second clutch C2, on the other hand, the wheel transfer torque transferred by the first brake B1 is calculated on the basis of the signal value (current value) supplied to the fourth linear solenoid valve SLC4 by use of the speed ratio Krf of the sixth speed established in the case where the first brake B1 is engaged and the torque distribution ratio Kef for the first brake B1 at the sixth speed. The element transfer torque value is also set in the same manner for the other clutches and brakes.

Next, in step #12, the determination section 47 compares the element transfer torque value for each target actuator and the determination value (allowable wheel transfer torque Twmx (absolute value)), and determines that the wheel transfer torque does not fall within the allowable range in the case where there are any target actuators, the element transfer torque values for which are equal to or more than the respective determination values, and determines that the wheel transfer torque falls within the allowable range in the case where there are not any target actuators, the element transfer torque values for which are equal to or more than the respective determination value.

In the case where the determination section 47 determines that the wheel transfer torque does not fall within the allowable range (step #12: No), the neutral travel control section 46 controls at least the target actuator, the element transfer torque value for which is equal to or more than the determination value, into a disengaged state (step #13). In the embodiment, the neutral travel control section 46 resets the signal controller (current feedback controller) for the actuator control section corresponding to the linear solenoid valve to be disengaged, and blocks a current to the linear solenoid valve.

In the case where the determination section 47 determines in step #12 that the wheel transfer torque falls within the allowable range (step #12: Yes), the determination section 47 determines in step #14 that the wheel transfer torque does not fall within the allowable range in the case where the rotational speed of the input shaft I or the engine E is equal to or more than a predetermined determination rotational speed determined in advance, and determines that the wheel transfer torque falls within the allowable range in the case where the rotational speed is less than the determination rotational speed.

In the case where the determination section 47 determines in step #14 that the wheel transfer torque does not fall within the allowable range (step #14: Yes), the neutral travel control section 46 controls all the target actuators into a disengaged state (step #13).

In the case where the determination section 47 determines that the wheel transfer torque falls within the allowable range (step #12: Yes, and step #14: No), on the other hand, the process returns to step #11 to perform transfer torque capacity determination again.

OTHER EMBODIMENTS

Lastly, other embodiments of the present invention will be described. The configuration of each embodiment described below is not limited to its independent application, and may be applied in combination with the configuration of other embodiments unless any contradiction occurs.

Figures 13, 14:
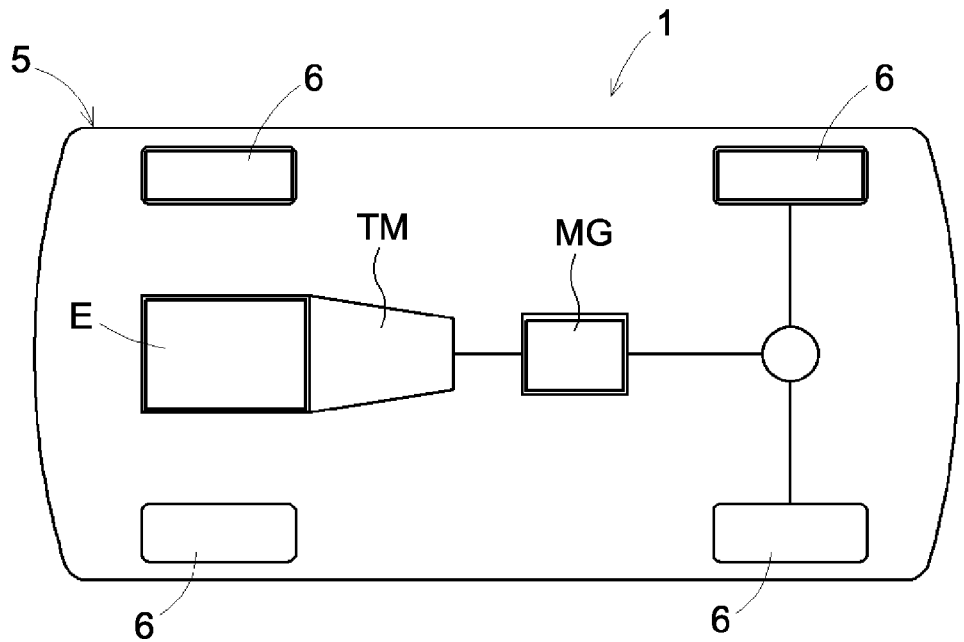
FIG. 13 is an operation table illustrating the operating state of a plurality of engagement elements at each shift speed of a speed change mechanism according to the second embodiment of the present invention.
FIG. 14 illustrates the overall configuration of a vehicle on which the vehicle drive device is mounted according to the second embodiment of the present invention.

(1) In the embodiment described above, the rotary electric machine MG is drivably coupled to the wheels 6 (here, rear wheels) which are different from the wheels 6 driven by the engine E. However, embodiments of the present invention are not limited thereto. That is, any configuration in which the rotary electric machine MG is drivably coupled to the wheels 6 not via the speed change mechanism TM may be used. For example, as illustrated in FIG. 14, the rotary electric machine MG may be drivably coupled to the wheels 6 driven by the engine E not via the speed change mechanism TM. Specifically, the rotary electric machine MG may be coupled to a portion of the power transfer path on the wheels 6 side with respect to the speed change mechanism TM.

Figure 12:
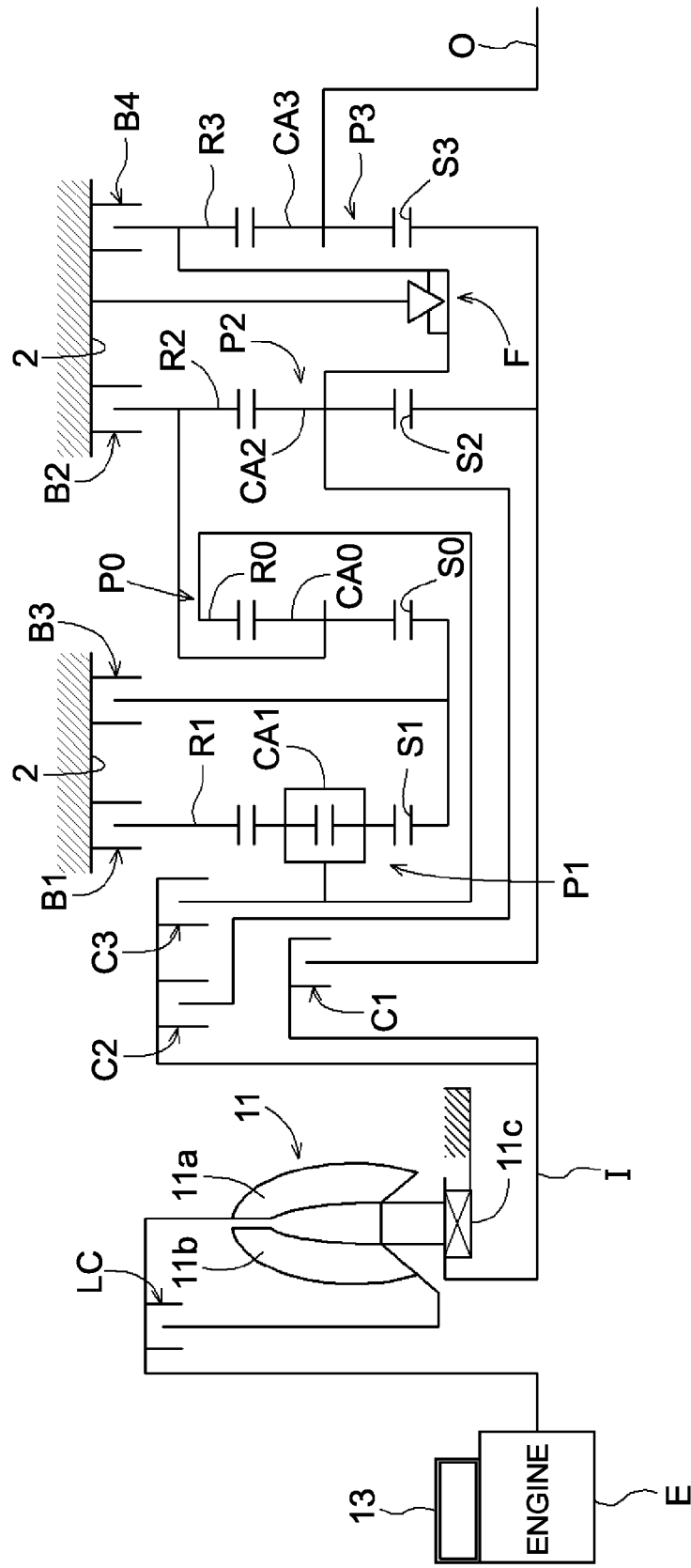
FIG. 12 is a schematic diagram illustrating the configuration of a vehicle drive device according to a second embodiment of the present invention.

(2) In the embodiment described above, as illustrated in FIGS. 2 and 3, two engagement elements are engaged to establish each shift speed in the speed change mechanism TM. However, embodiments of the present invention are not limited thereto. That is, one or three or more engagement elements may be engaged to establish each shift speed in the speed change mechanism TM. For example, the speed change mechanism TM illustrated in FIG. 12 and FIG. 13 may also be used. Specifically, the speed change mechanism TM provides eight shift speeds (a first speed (1st), a second speed (2nd), a third speed (3rd), a fourth speed (4th), a fifth speed (5th), a sixth speed (6th), a seventh speed (7th), and an eighth speed (8th)) with different speed ratios as forward speeds. In order to establish the shift speeds, the speed change mechanism TM includes gear mechanisms including a 0-th planetary gear device P0, a first planetary gear device P1, a second planetary gear device P2, and a third planetary gear device P3 and eight engagement elements C1, C2, C3, B1, B2, B3, B4, and F. The rotational state of the rotary elements of each planetary gear device is changed by controlling engagement and disengagement of the plurality of engagement elements C1, B1, . . . excluding the one-way clutch F, and switching is made among the eight shift speeds by selectively engaging three of the plurality of engagement elements C1, B1, . . . . Besides the eight shift speeds described above, the speed change mechanism TM also provides two reverse speeds (a first reverse speed (Rev1) and a second reverse speed (Rev2)). In the case of the speed change mechanism TM as well, the neutral travel control section 46 disengages disengagement engagement elements, which are at least some of the plurality of engagement elements C1, B1, . . . , to control the speed change mechanism TM into a neutral state. For example, as in the embodiment described above, the neutral travel control section 46 is configured to engage preparation engagement elements which are engagement elements other than one engagement element determined in advance, among the engagement elements engaged to establish the shift speed established when the neutral state control is ended, and to disengage engagement elements other than the preparation engagement elements, among the plurality of engagement elements provided in the speed change mechanism TM, as disengagement engagement elements.

(3) In the embodiment described above, the torque converter 11 is provided between the engine E and the speed change mechanism TM. However, embodiments of the present invention are not limited thereto. That is, the torque converter 11 may not be provided, or a clutch may be provided in place of the torque converter 11, between the engine E and the speed change mechanism TM.

(4) In the embodiment described above, the linear solenoid valves SLC1, SLC4, . . . are provided as actuators that control the engagement/disengagement state of the engagement elements C1, B1, . . . of the speed change mechanism TM, respectively, and the signal value supplied to each actuator is a current value. However, embodiments of the present invention are not limited thereto. That is, actuators other than the linear solenoid valves, for example duty solenoid valves, may be provided, and the signal value may be a signal value other than a current value, for example a duty signal value that varies the duty ratio for turning on and off the solenoid valves.

In addition, the engagement elements C1, B1, . . . of the speed change mechanism TM may be engagement elements controlled in accordance with a drive force other than a hydraulic pressure such as a drive force of an electromagnet or a drive force of a servomotor. Electromagnets, motors, or the like may be used as the actuators. The signal value may be a signal value supplied to the actuators.

(5) In the embodiment described above, the operation indication value which represents the operating state of each of the target actuators is either a signal value supplied to the target actuator or an element transfer torque value indicating torque transferred by the disengagement engagement element. However, embodiments of the present invention are not limited thereto. That is, the operation indication value for each target actuator may be any indication value that represents the operating state. For example, the operation indication value may be a value of a hydraulic pressure supplied to each target actuator and detected by a pressure sensor, or may be a stroke position of a piston of each disengagement engagement element detected by a position sensor.

(6) In the embodiment described above, the control device 30 includes the plurality of control units 32 to 34, and the plurality of control units 32 to 34 include the plurality of functional sections 41 to 47 in a distributed manner. However, embodiments of the present invention are not limited thereto. That is, the control device 30 may include the plurality of control units 32 to 34 discussed above as control devices integrated or separated in any combination. The plurality of functional sections 41 to 47 may also be distributed in any combination.

(7) In the embodiment described above, the neutral travel control section 46 is configured to engage preparation engagement elements which are engagement elements other than one engagement element determined in advance, among the engagement elements engaged to establish the shift speed established when the neutral state control is ended, and to disengage engagement elements other than the preparation engagement elements, among the plurality of engagement elements provided in the speed change mechanism TM, as disengagement engagement elements. However, embodiments of the present invention are not limited thereto. The neutral travel control section 46 may be configured to disengage all the engagement elements provided in the speed change mechanism TM as disengagement engagement elements when controlling the speed change mechanism TM into a neutral state. In this case, there is no preparation engagement element in the leftmost column of FIG. 9, and there are one or more estimated established shift speeds which may be established in the case where each disengagement engagement element is engaged, and there are also one or more allowable signal values (current values). In this case, the smallest one of the one or more allowable signal values (current values) corresponding to the disengagement engagement elements may be set as the determination value for each target actuator.

In addition, there are one or more estimated established shift speeds which may be established in the case where each disengagement engagement element is engaged, and there are also one or more values of the wheel transfer torque Twf transferred by the disengagement engagement element calculated on the basis of the signal value (current value) supplied to each target actuator. In this case, the largest one of the one or more values of the wheel transfer torque Twf (absolute values) corresponding to each disengagement engagement element may be set as the element transfer torque value for each target actuator.

(8) In the embodiment described above, the determination section 47 is configured to determine that the wheel transfer torque does not fall within the allowable range also in the case where the rotational speed of the input shaft I or the engine E is raised to a predetermined rotational speed, in addition to the determination based on the comparison between the operation indication value and the determination value. However, embodiments of the present invention are not limited thereto. That is, the determination section 47 may be configured not to make a determination on the basis of the rotational speed of the input shaft I or the engine E.

INDUSTRIAL APPLICABILITY

The present invention may be suitably applied to a control device for a vehicle drive device that controls a vehicle drive device including an input member drivably coupled to an internal combustion engine serving as a drive force source for wheels, an output member drivably coupled to the wheels, a speed change mechanism that includes a plurality of engagement elements to establish a plurality of shift speeds in accordance with the engagement/disengagement state of the plurality of engagement elements and transfers rotation of the input member to the output member while changing the speed of the rotation with the speed ratio of each shift speed, and a rotary electric machine drivably coupled to the wheels not via the speed change mechanism.

DESCRIPTION OF THE REFERENCE NUMERALS

1 VEHICLE DRIVE DEVICE
11 TORQUE CONVERTER
30 CONTROL DEVICE FOR VEHICLE DRIVE DEVICE (CONTROL DEVICE)
45 ACTUATOR CONTROL SECTION
46 NEUTRAL TRAVEL CONTROL SECTION
47 DETERMINATION SECTION
E ENGINE (INTERNAL COMBUSTION ENGINE)
I INPUT SHAFT (INPUT MEMBER)
O OUTPUT GEAR (OUTPUT MEMBER)
LC LOCK-UP CLUTCH
MG ROTARY ELECTRIC MACHINE
TM SPEED CHANGE MECHANISM
PC HYDRAULIC CONTROL DEVICE
C1 FIRST CLUTCH
C2 SECOND CLUTCH
C3 THIRD CLUTCH
B1 FIRST BRAKE
B2 SECOND BRAKE
SLC1 FIRST LINEAR SOLENOID VALVE
SLC2 SECOND LINEAR SOLENOID VALVE
SLC3 THIRD LINEAR SOLENOID VALVE
SLC4 FOURTH LINEAR SOLENOID VALVE
SLC5 FIFTH LINEAR SOLENOID VALVE

The invention claimed is:

1. A control device for a vehicle drive device that controls the vehicle drive device including an input member drivably coupled to an internal combustion engine serving as a drive force source for wheels, an output member drivably coupled to the wheels, a speed change mechanism that includes a plurality of engagement elements to establish a plurality of shift speeds in accordance with an engagement/disengagement state of the plurality of engagement elements and transfers rotation of the input member to the output member while changing a speed of the rotation with a speed ratio of each shift speed, and a rotary electric machine drivably coupled to the wheels not via the speed change mechanism, comprising:

a neutral travel control section that performs neutral travel control during a state in which the wheels are rotating by a drive force of the rotary electric machine, the neutral travel control controlling disengageable engagement elements into a disengaged state, and by executing the neutral travel control, a state of the speed change mechanism is controlled into a neutral state where transfer of a drive force between the input member and the output member is not performed;

a determination section that determines and compares each of a plurality of operation indication values, each that represents an operating state of one of target actuators, which are actuators that control the engagement/disengagement state of the disengageable engagement elements, with a corresponding one of a plurality of determination values set in association with a corresponding one of the target actuators, and determines on the basis of comparison results whether or not a wheel transfer torque transferred from the speed change mechanism to the wheels falls within the allowable range during the execution of the neutral travel control; and wherein the disengageable engagement elements include at least one of the engagement elements which are necessary to be engaged in order to establish one of the shift speeds and all engagement elements which are not necessary to be engaged to establish the one of the shift speeds, the determination section executes determination for all the disengageable engagement elements during execution of the neutral travel control.

2. The control device for a vehicle drive device according to claim 1, wherein
the determination value is set for each shift speed that may be established in the case where each of the disengageable engagement elements is engaged.

3. The control device for a vehicle drive device according to claim 1, wherein:
when controlling the speed change mechanism into the neutral state, the neutral travel control section disengages at least one of the engagement elements which was engaged to establish a predetermined shift speed to be established when the neutral state is ended, and engages the rest of the engagement elements which were engaged to establish the predetermined shift speed excluding the now disengaged disengageable engagement element; and
the determination value is set for each of the rest of the engagement elements and for each shift speed that may be established in the case where each of the disengageable engagement elements is engaged.

4. The control device for a vehicle drive device according to claim 1, wherein
the operation indication value is a signal value supplied to the target actuator, or an element transfer torque value indicating torque transferred by the disengageable engagement element.

5. The control device for a vehicle drive device according to claim 1, wherein
the determination value set in association with each of the disengageable engagement elements is set on the basis of allowable wheel transfer torque determined in advance as torque allowed to be transferred from the speed change mechanism to the wheels during the neutral travel control, and on the basis of the operation indication value corresponding to transfer torque of the disengageable engagement element required for the allowable wheel transfer torque to be transferred to the wheels at a shift speed that may be established in the case where the disengageable engagement element corresponding to the determination value is engaged.

6. The control device for a vehicle drive device according to claim 1, wherein:
the operation indication value is an element transfer torque value indicating torque transferred by the disengageable engagement element; and
the element transfer torque value is a value obtained by converting a signal value supplied to the target actuator for the disengageable engagement element into a disengagement transfer torque value indicating torque transferred through the disengageable engagement element, and converting the disengagement transfer torque value into a value of the wheel transfer torque transferred to the wheels at a shift speed that may be established in the case where the disengageable engagement element is engaged.

7. The control device for a vehicle drive device according to claim 1, wherein when controlling the speed change mechanism into the neutral state, the neutral travel control section disengages at least one of the engagement elements engaged to establish a predetermined shift speed established when the neutral state is ended as the disengageable engagement element, and engages the rest of the engagement elements engaged to establish the predetermined shift speed excluding the disengageable engagement element.

8. The control device for a vehicle drive device according to claim 1, wherein
the determination section determines that the wheel transfer torque does not fall within the allowable range also in the case where a rotational speed of the input member or the internal combustion engine is raised to a predetermined rotational speed, in addition to the determination based on the comparison between the operation indication value and the determination value.

9. The control device for a vehicle drive device according to claim 1, wherein the determination value is set for each shift speed that may be established in the case where each of the disengageable engagement elements is engaged.

10. The control device for a vehicle drive device according to claim 9, wherein:
when controlling the speed change mechanism into the neutral state, the neutral travel control section disengages at least one of the engagement elements which was engaged to establish a predetermined shift speed to be established when the neutral state is ended as the disengageable engagement element, and engages the rest of the engagement elements which were engaged to establish the predetermined shift speed excluding the now disengaged disengagement engagement element; and
the determination value is set for each of the rest of the engagement elements and for each shift speed that may be established in the case where each of the disengageable engagement elements is engaged.

11. The control device for a vehicle drive device according to claim 9, wherein the operation indication value is a signal value supplied to the target actuator, or an element transfer torque value indicating torque transferred by the disengageable engagement element.

12. The control device for a vehicle drive device according to claim 9, wherein the determination value set in association with each of the disengageable engagement elements is set on the basis of allowable wheel transfer torque determined in advance as torque allowed to be transferred from the speed change mechanism to the wheels during the neutral travel control, and on the basis of the operation indication value corresponding to transfer torque of the disengageable engagement element required for the allowable wheel transfer torque to be transferred to the wheels at a shift speed that may be established in the case where the disengageable engagement element corresponding to the determination value is engaged.

13. The control device for a vehicle drive device according to claim 9, wherein:
the operation indication value is an element transfer torque value indicating torque transferred by the disengageable engagement element; and
the element transfer torque value is a value obtained by converting a signal value supplied to the target actuator for the disengageable engagement element into a disengagement transfer torque value indicating torque transferred through the disengageable engagement element, and converting the disengagement transfer torque value into a value of the wheel transfer torque transferred to the wheels at a shift speed that may be established in the case where the disengageable engagement element is engaged.

14. The control device for a vehicle drive device according to claim 9, wherein
when controlling the speed change mechanism into the neutral state, the neutral travel control section disengages at least one of the engagement elements engaged to establish a predetermined shift speed established when the neutral state is ended as the disengageable engagement element, and engages the rest of the engagement elements engaged to establish the predetermined shift speed excluding the disengageable engagement element.

15. The control device for a vehicle drive device according to claim 9, wherein the determination section determines that the wheel transfer torque does not fall within the allowable range also in the case where a rotational speed of the input member or the internal combustion engine is raised to a predetermined rotational speed, in addition to the determination based on the comparison between the operation indication value and the determination value.

16. The control device for a vehicle drive device according to claim 1, wherein:
when controlling the speed change mechanism into the neutral state, the neutral travel control section disengages at least one of the engagement elements which was engaged to establish a predetermined shift speed established when the neutral state is ended as the disengageable engagement element, and engages the rest of the engagement elements which were engaged to establish the predetermined shift speed excluding the now disengaged disengageable engagement element; and
the determination value is set for each of the rest of the engagement elements and for each shift speed that may be established in the case where each of the disengageable engagement elements is engaged.

17. The control device for a vehicle drive device according to claim 1, wherein the operation indication value is a signal value supplied to the target actuator, or an element transfer torque value indicating torque transferred by the disengageable engagement element.

18. The control device for a vehicle drive device according to claim 1, wherein the determination value set in association with each of the disengageable engagement elements is set on the basis of allowable wheel transfer torque determined in advance as torque allowed to be transferred from the speed change mechanism to the wheels during the neutral travel control, and on the basis of the operation indication value corresponding to transfer torque of the disengageable engagement element required for the allowable wheel transfer torque to be transferred to the wheels at a shift speed that may be established in the case where the disengageable engagement element corresponding to the determination value is engaged.

19. The control device for a vehicle drive device according to claim 1, wherein:
the operation indication value is an element transfer torque value indicating torque transferred by the disengageable engagement element; and
the element transfer torque value is a value obtained by converting a signal value supplied to the target actuator for the disengageable engagement element into a disengagement transfer torque value indicating torque transferred through the disengageable engagement element, and converting the disengagement transfer torque value into a value of the wheel transfer torque transferred to the wheels at a shift speed that may be established in the case where the disengageable engagement element is engaged.

20. The control device for a vehicle drive device according to claim 1, wherein when controlling the speed change mechanism into the neutral state, the neutral travel control section disengages at least one of the engagement elements engaged to establish a predetermined shift speed established when the neutral state is ended as the disengageable engagement element, and engages the rest of the engagement elements engaged to establish the predetermined shift speed excluding the disengageable engagement element.

21. The control device for a vehicle drive device according to claim 1, wherein the determination section determines that the wheel transfer torque does not fall within the allowable range also in the case where a rotational speed of the input member or the internal combustion engine is raised to a predetermined rotational speed, in addition to the determination based on the comparison between the operation indication value and the determination value.

22. The control device for a vehicle drive device according to claim 1, wherein the determination value is set on the basis of allowable wheel transfer torque determined in advance as torque allowed to be transferred from the speed change mechanism to the wheels during the neutral travel control.

* * * * *